United States Patent [19]

Ulrich, Jr.

[11] 4,047,765
[45] Sept. 13, 1977

[54] HYDRAULIC POWER TRANSMISSION AND BRAKING SYSTEM FOR VEHICLES

[75] Inventor: Bernhard Ulrich, Jr., Corpus Christi, Tex.

[73] Assignee: Tex-Trans, Inc., Corpus Christi, Tex.

[21] Appl. No.: 671,389

[22] Filed: Mar. 29, 1976

Related U.S. Application Data

[62] Division of Ser. No. 485,632, July 3, 1974, Pat. No. 3,966,365, which is a division of Ser. No. 305,513, Nov. 10, 1972, Pat. No. 3,827,239.

[51] Int. Cl.² .................................................. B60T 8/18
[52] U.S. Cl. ..................................... 303/24 F; 60/551; 60/581
[58] Field of Search ........................ 188/195, 349, 139; 303/6 C, 22 R, 24 F; 60/550, 551, 581, 592, 593, 594

[56] References Cited

U.S. PATENT DOCUMENTS

| | | | |
|---|---|---|---|
| 2,807,337 | 9/1957 | Starling | 188/349 |
| 2,867,299 | 1/1959 | Jankauskas | 188/349 |
| 2,940,797 | 6/1960 | Abell | 303/24 F |
| 2,953,413 | 9/1960 | Jankauskas | 303/24 F |
| 3,035,869 | 5/1962 | Francia | 303/6 C |
| 3,707,845 | 1/1973 | Mitton | 60/581 |

*Primary Examiner*—George E. A. Halvosa
*Attorney, Agent, or Firm*—Darby & Darby

[57] ABSTRACT

A hydraulic braking system is provided for automatically apportioning braking of the wheels of a vehicle in accordance with the load on respective wheels. A plurality of brake control assemblies each dedicated to one of the wheels of the vehicle are coupled to produce braking of the corresponding wheel upon activation of the brake pedal. The degree of actuation of each brake control assembly is controlled by an element which senses load differences between all wheels on the vehicle (including load differences between wheels on either side of the vehicle and between front and rear wheels), and adjusts the degree of actuation of the corresponding brake control assembly accordingly. In an illustrative embodiment each brake control assembly includes a brake control cylinder having a piston movably disposed therein. The pistons are coupled to the brake pedal so as to be maximally advanced into the brake control cylinder when a maximum brake force is applied. The load sensing device is a pendulum which is mounted for displacement along the length and width of the vehicle from a predefined normal position. The pendulum is coupled to each of the pistons so that, in its normal position, all pistons are equally displaced within their corresponding cylinders so that, when a force is applied to the brake pedal, all wheels receive an equal braking force. In operation, when the wheels of the vehicle have unequal loads, such as on turns, the pendulum is displaced from its normal position and causes the various pistons to be displaced by different amounts in their corresponding cylinders. Thus, when a force is applied to the brake pedal, the braking force is apportioned unequally among the wheels and in proportion to the load on each wheel.

12 Claims, 19 Drawing Figures

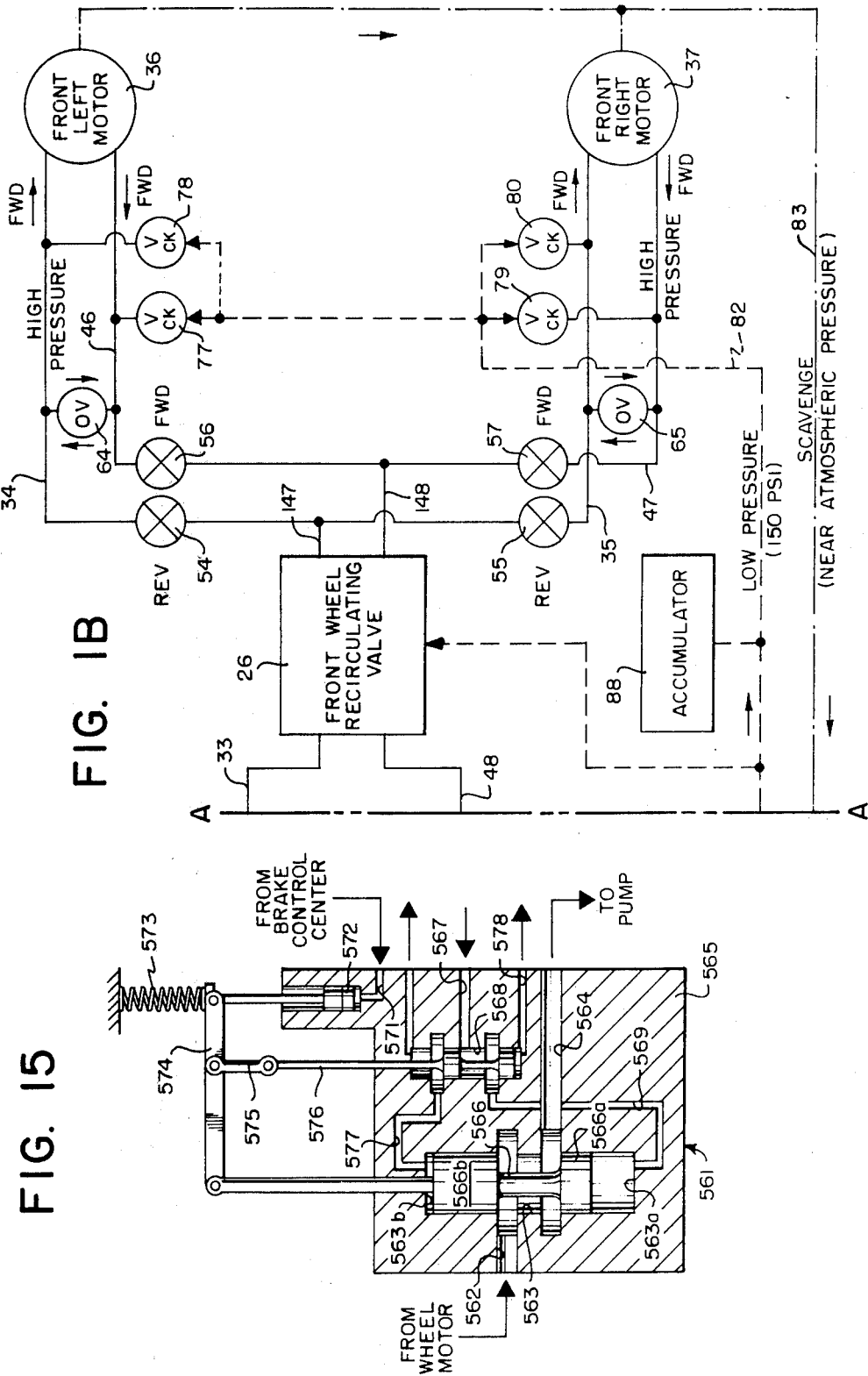

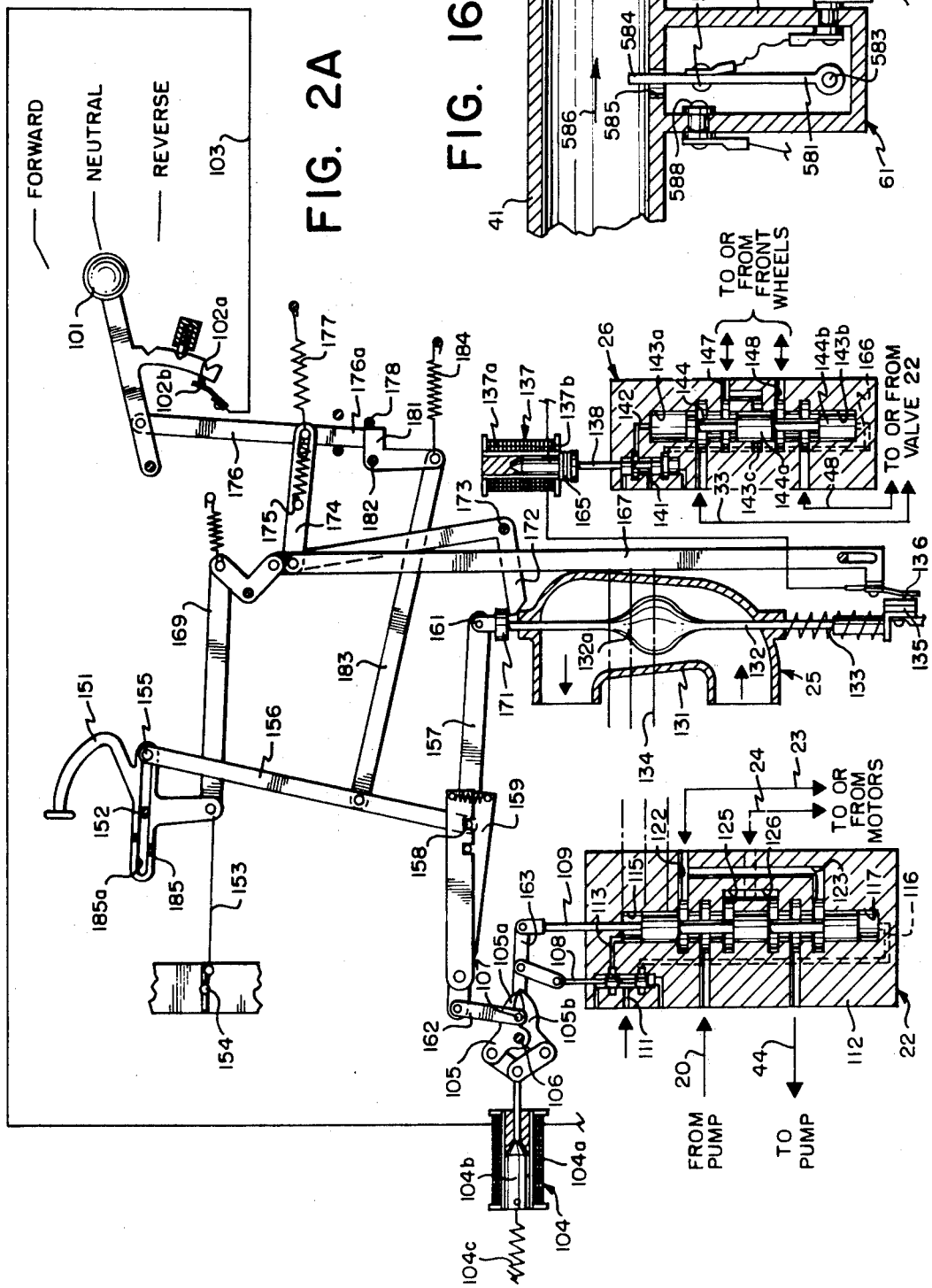

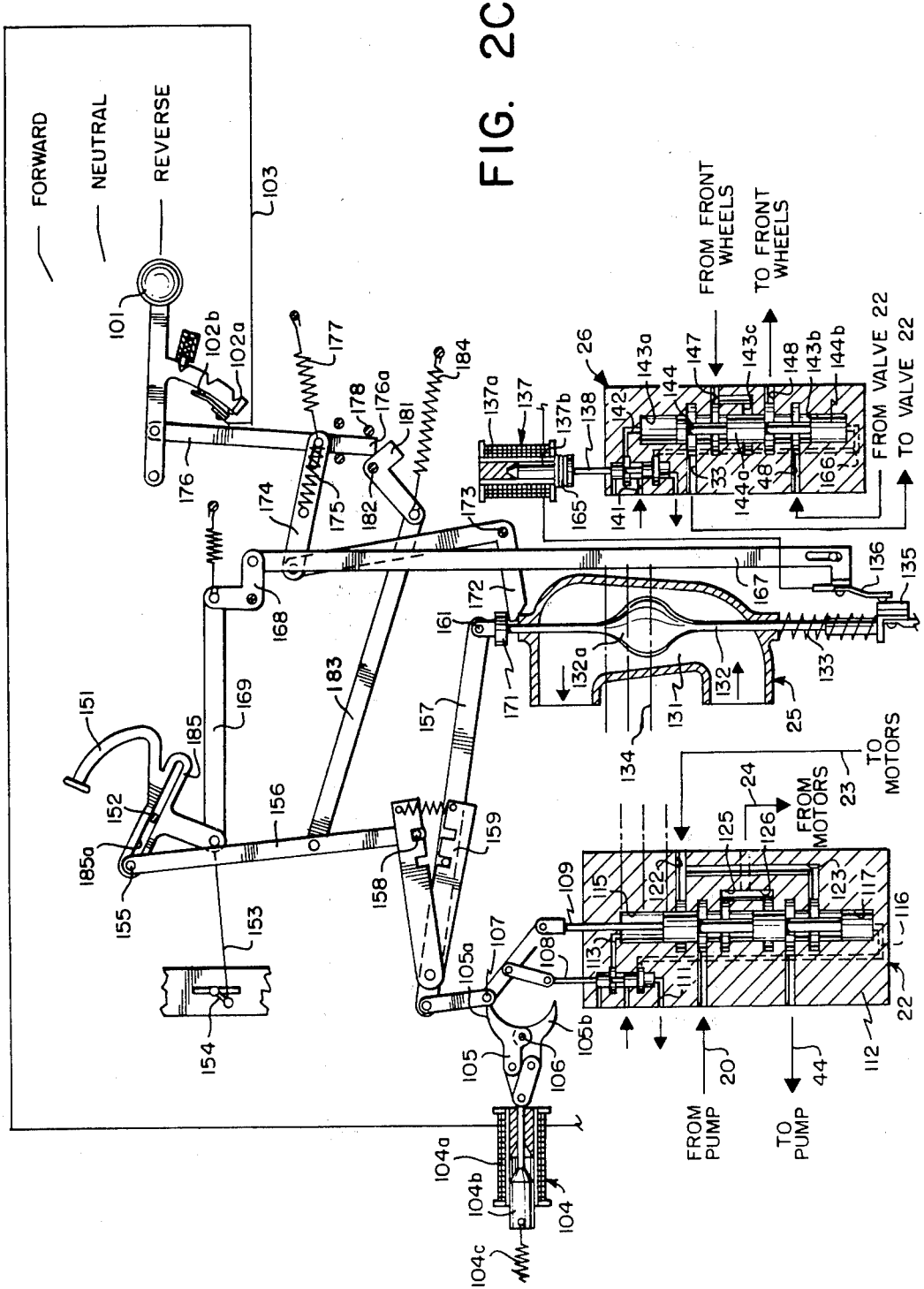

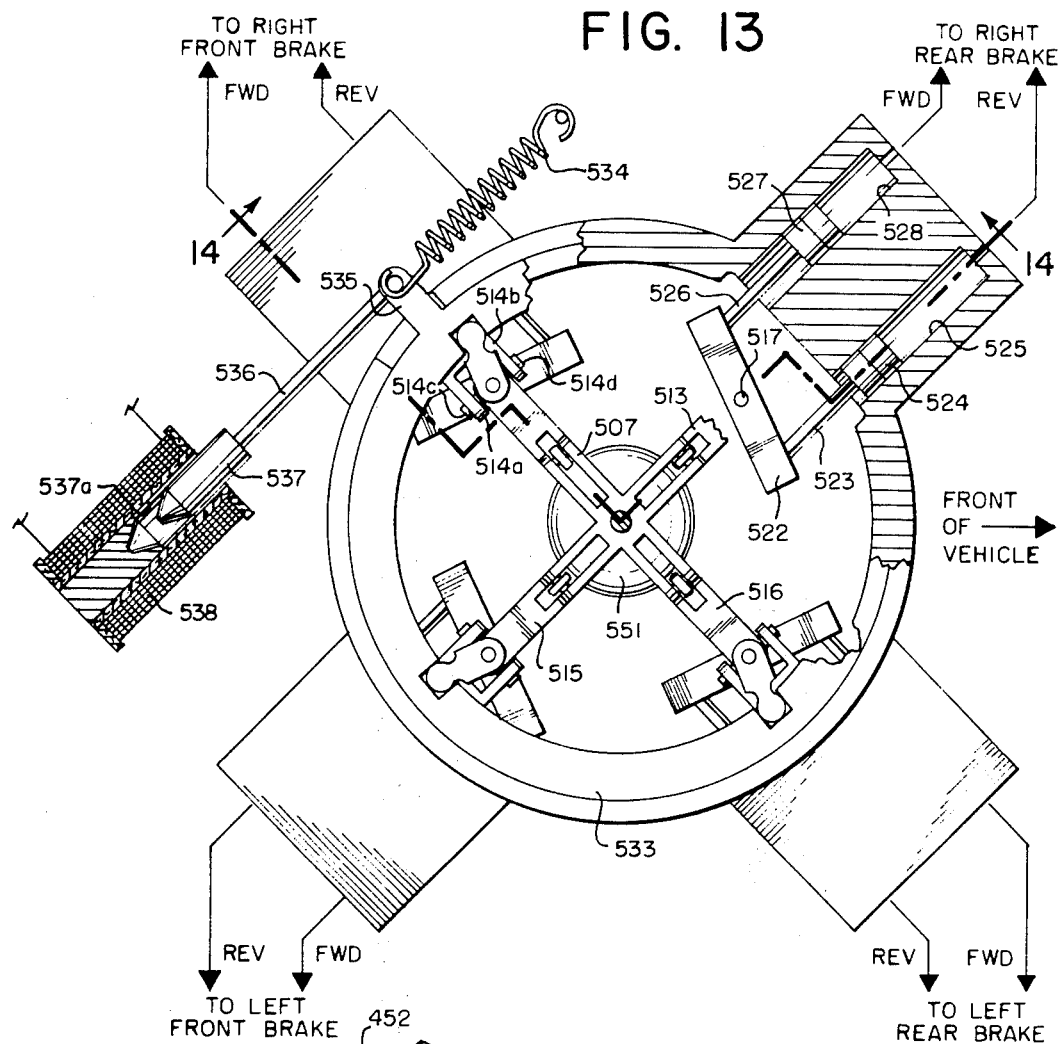
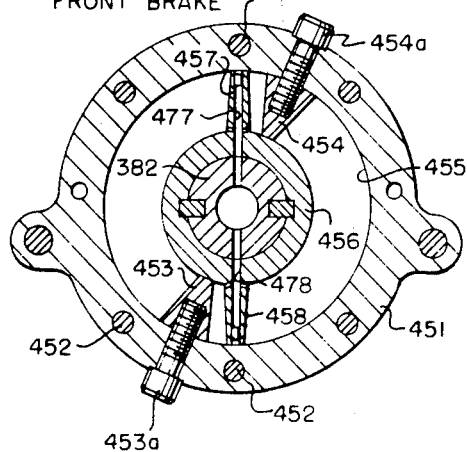
FIG. 13
FIG. 11

HYDRAULIC POWER TRANSMISSION AND BRAKING SYSTEM FOR VEHICLES

This is a division of Ser. No. 485632, now U.S. Pat. No. 3,966,365, filed July 3, 1974, which was a division of Ser. No. 305513, now U.S. Pat. No. 3,827,239, filed Nov. 10, 1972.

This invention relates to hydraulic power transmission systems and, more particularly, to a hydraulic power transmission and braking system for vehicles such as passenger automobiles.

One of the problems of the prior art power transmission systems for vehicles is that the prime mover, or engine, of the vehicle must operate over a relatively wide range of speeds in order to accommodate the wide range of conditions under which a typical vehicle, such as, for example, a passenger automobile, is operated. For example, during the acceleration of an automobile equipped with a conventional manual or automatic transmission system, the speed of the automobile's engine varies over a relatively wide speed range and only momentarily operates at the speed at which it produces its maximum output power level.

Another problem of conventional vehicle power transmission systems is that they are relatively heavy and bulky, their propeller shafts and differential present problems of road clearance and, in the case of passenger automobiles, a "tunnel" through the passenger compartment is often required. Further, conventional automatic transmission systems are complex and expensive to build and maintain.

Further, conventional vehicular power transmission systems are normally both structurally and functionally independent from the braking systems used in the vehicles, with the result that, if either the power transmission system or the braking system fails, the vehicle is disabled.

Moreover, conventional braking systems fail to apportion the braking force to each wheel in accordance with the load on that wheel. For example, when automobile brakes are applied sharply, the momentum of the vehicle causes an increased load on the front wheels, and a reduced load on the rear wheels, but conventional braking systems apply approximately equal braking force to both the front wheels and the rear wheels, with the result that the lightly loaded rear wheels tend to lock and skid. Similarly, conventional braking systems fail to compensate for wheel loading conditions that occur when the vehicle is operated on an incline or rounding a corner, or when the vehicle is unbalanced by a heavy cargo.

It is therefore an object of this invention to provide a vehicular power transmission and braking system which overcomes the problems of the prior art systems.

It is a more particular object of this invention to provide a hydraulic power transmission system which enables the prime mover of a vehicle to operate at maximum horsepower at full throttle or maximum fuel efficiency at partial throttle.

It is also an object of this invention to provide a hydraulic power transmission system using a variable displacement pump which responds automatically to vehicle operating conditions.

It is another object of this invention to provide a hydraulic power transmission system that switches automatically from the 4-wheel drive mode to the 2-wheel drive mode when the vehicle accelerates past a predetermined speed.

It is still another object of this invention to provide a combined hydraulic power transmission and braking system for vehicles.

It is yet another object of this invention to provide a hydraulic power transmission and braking system in which the braking force is automatically apportioned between the vehicle wheels in accordance with the load on each wheel.

According to the above and other objects, the present invention provides a hydraulic power transmission and braking system including a plurality of individual hydraulic wheel motors, preferably one motor for each vehicle wheel, and a variable displacement hydraulic pump which is driven by suitable prime mover, such as, for example, an internal combustion engine, and which is connected to the hydraulic wheel motors through suitable control apparatus including a main control valve for controlling the flow of hydraulic fluid in response to a "forward/neutral/reverse" control and an accelerator control, a device for switching the mode of operation of the system from 4-wheel drive to 2-wheel drive when the vehicle accelerates past a predetermined speed and a braking control system which operates by restricting the flow of hydraulic fluid from the hydraulic wheel motors, which act as pumps when the vehicle is decelerating.

Other objects and advantages of the present invention will be apparent from the following detailed description and accompanying drawings which set forth by way of example, the principles of the present invention and the preferred embodiment for carrying out those principles.

IN THE DRAWINGS

FIG. 1A, 1B is a schematic diagram of a preferred embodiment of the hydraulic power transmission and braking system of the present invention;

FIG. 2A is a diagram of a preferred embodiment of the control apparatus of the present hydraulic power transmission system shown in the NEUTRAL condition;

FIG. 2C is a diagram of the control apparatus of FIG. 2A, shown in the REVERSE condition;

FIG. 11 is a cross-sectional view of the variable displacement hydraulic pump taken along the line 11—11 of FIG. 7 showing the damper device for the automatic displacement control mechanism shown in FIG. 10;

FIG. 13 is a cross-sectional plan view, partly broken away, of the brake control apparatus of the hydraulic power transmission and braking system of the present invention;

FIG. 15 is a cross-sectional view of the preferred form of brake valve used in the hydraulic power transmission and braking system of the present invention; and FIG. 16 is a cross-sectional view of a fluid flow direction sensing device suitable for use in the hydraulic power transmission and braking system of the present invention.

Figure 1A:
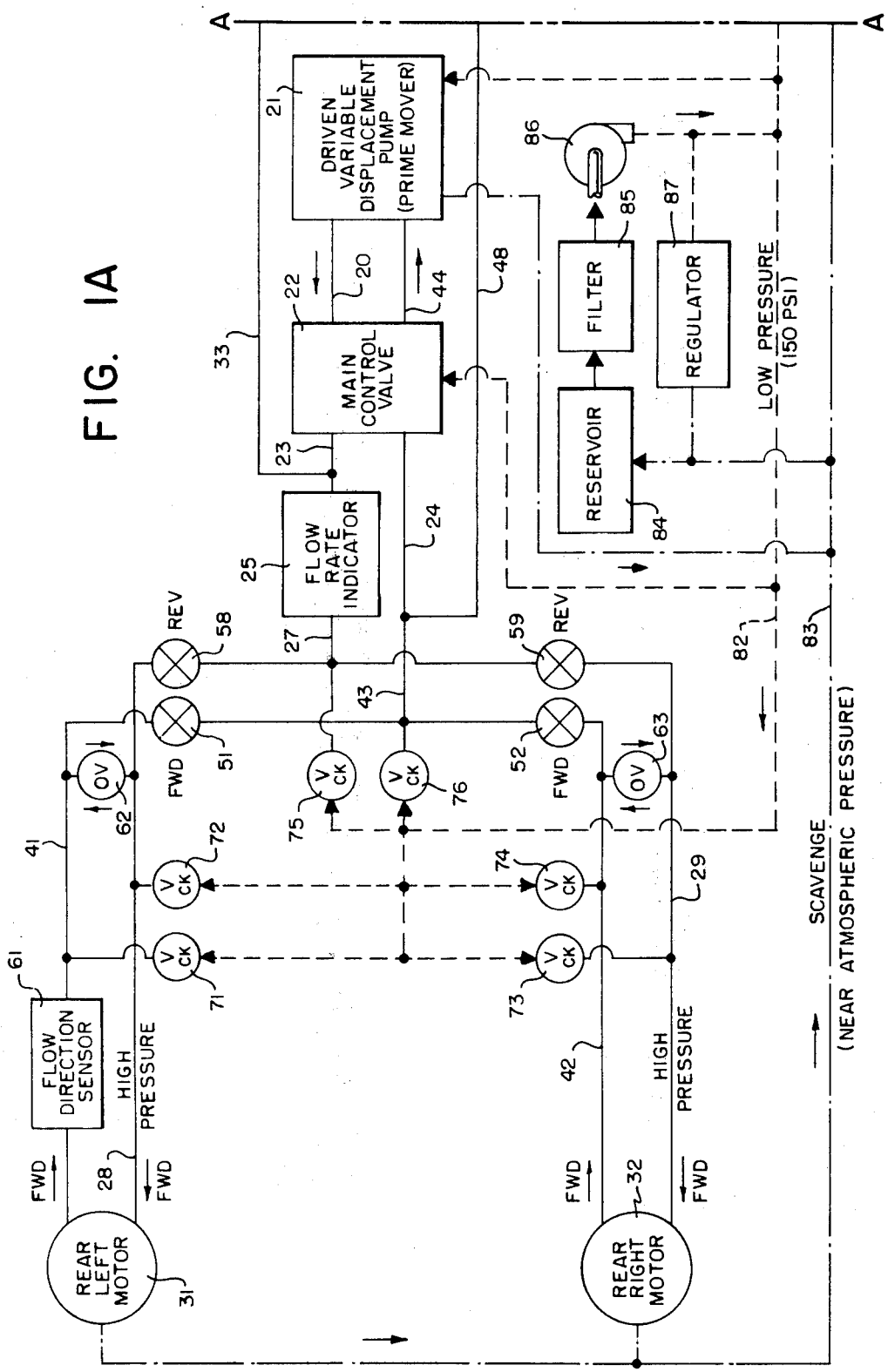

Referring in detail to FIGS. 1A and 1B of the drawings, there is shown a schematic diagram of the preferred embodiment of the hydraulic power transmission and braking system of the present invention. In the preferred embodiment shown in FIG. 1A, hydraulic fluid under pressure is supplied by variable displacement hydraulic pump 21 which is driven by a suitable prime mover such as, for example, an internal combustion engine. The preferred form of the variable displacement hydraulic pump 21 is described in detail in connection with FIGS. 6–12. It will be appreciated, however, that other forms of variable displacement hydraulic pumps can be employed within the spirit and scope of the present invention. Further, it will be appreciated that certain objects and advantages of the present invention can, in fact, be accomplished by using a fixed displacement hydraulic pump as the source of hydraulic fluid under pressure for the system.

Briefly, the use of the variable displacement hydraulic pump 21 in the present hydraulic power transmission system enables more efficient use of the engine which is used as the prime mover for the vehicle. More particularly, as the vehicle accelerates from a standstill, with full throttle opening, its engine is able to operate at the constant speed at which it produces its maximum power output, while the variable displacement pump 21 accomplishes the necessary changes in the speed and torque ratios between the engine and the wheels.

For example, when the vehicle is starting from a standstill with full throttle, the variable displacement pump 21 will operate at its minimum displacement and maximum pressure (2000 p.s.i., for example) so as to deliver full power to the wheels in the form of maximum torque at minimum speed. As the speed of the vehicle increases, the displacement of variable displacement pump 21 will increase and its output pressure will drop so that a constant power level, corresponding to the maximum power output of the engine will be delivered to the wheels as the vehicle accelerates.

In the preferred embodiment of the present invention, the ratio of the maximum displacement of variable displacement pump 21 to its minimum displacement is about 2.5:1 while the ratio of the maximum output pressure at minimum displacement to the maximum output pressure at maximum displacement is similarly about 2.5:1. More specifically, the maximum output pressure at minimum displacement may be in the neighborhood of 2000 p.s.i. while the maximum output pressure at maximum displacement may be in the neighborhood of about 800 p.s.i. It will be appreciated, however, that the range of maximum to minimum displacement of the variable displacement pump 21 may be greater than or less than 2.5:1 depending upon the particular vehicle performance goals to be accomplished.

similarly, while the maximum displacement of the pump 21 may be approximately equal to the displacement of two wheel motors in a passenger vehicle transmission system, it will be appreciated that the displacement of the pump 21 may be much smaller in relation to the displacement of the wheel motors in the case of large earth moving equipment, for example, and that the displacement of the pump may be much larger in relation to the motors in certain other applications such as machine tools, for example.

The high pressure hydraulic fluid from variabale displacement pump 21 is fed via line 20 to the main control valve 22 which is described in greater detail in connection with FIGS. 2A-C of the drawings. Briefly, main control valve 22 responds to a selector control lever 101 (FIGS. 2A-C) to direct the high pressure hydraulic fluid from pump 21 to line 23 if the selector control lever 101 is in FORWARD position, and to line 24 if the selector control lever 101 is in REVERSE position. The main control valve 22 also responds to the vehicle accelerator control pedal 151 (FIGS. 2A-C) and the flow rate indicator 25 to control the flow rate of hydraulic fluid to the hydraulic wheel motors 31, 32, 36 and 37 as will be explained in greater detail in connection with FIGS. 2A-C.

Although the hydraulic wheel motors 31, 32, 36 and 37 are primarily referred to as "motors" throughout the present specification, it will be appreciated that these devices are simply hydraulic machines which can act either as "motors" or as "pumps" depending upon operating conditions. For example, hydraulic machines 31, 32, 36 and 37 act as "motors" when the vehicle is accelerating and act as "pumps" when the vehicle is decelerating.

Figure 2B:
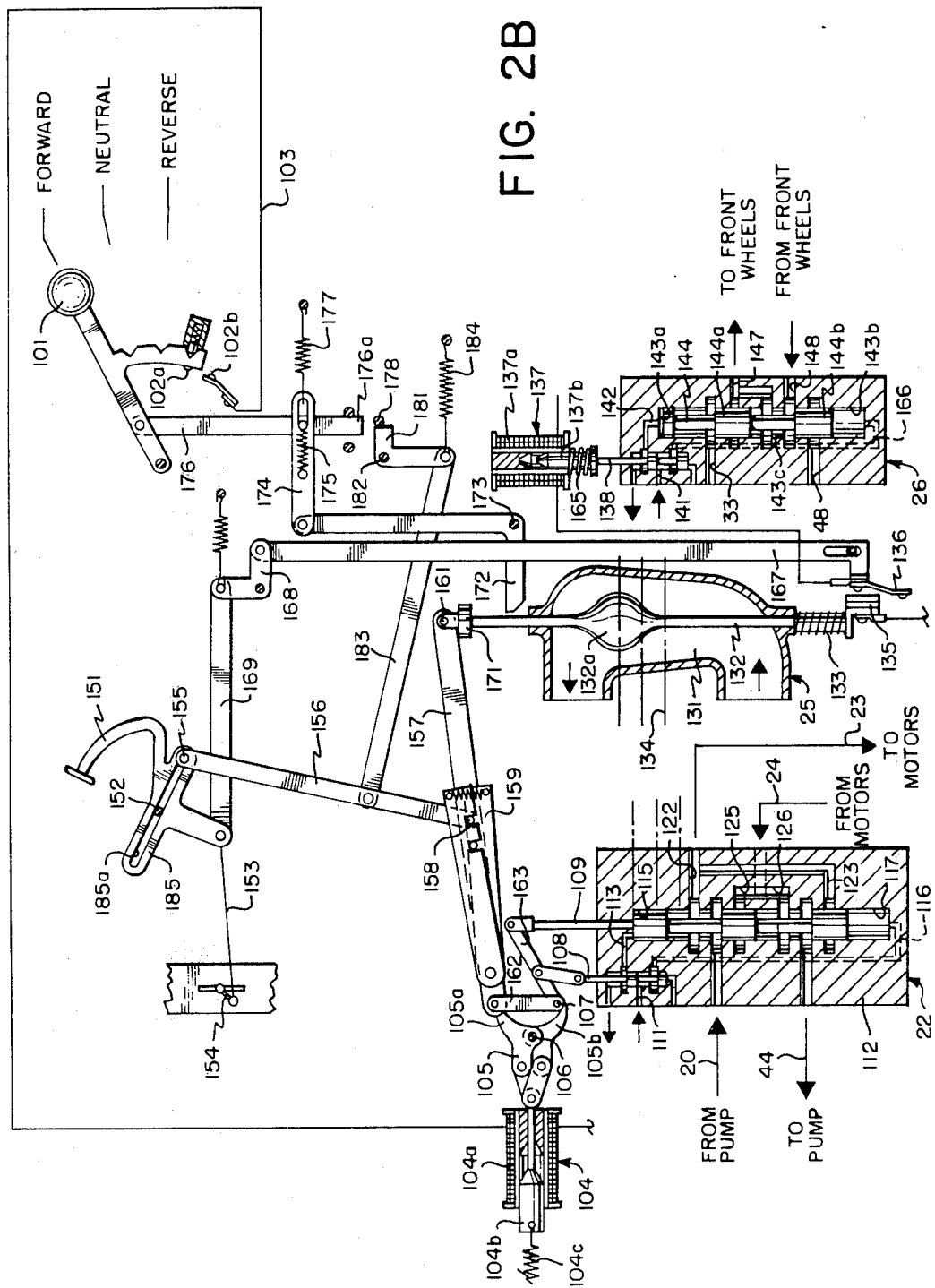
FIG. 2B is a diagram of the control apparatus of FIG. 2A, shown in the FORWARD condition.

Briefly, flow rate indicator 25, which is shown in greater detail in FIGS. 2A-C, serves to increase the flow of hydraulic fluid to the wheel motors 31, 32, 36 and 37 as the vehicle speed increases. Also, in the preferred embodiment of the present hydraulic power transmission and braking system, the flow rate indicator 25 serves to actuate a switch 135/136 which operates the front wheel recirculating valve 26 to change the mode of operation of the vehicle from four-wheel drive to two-wheel drive or vice versa, as will be explained in greater detail in connection with FIGS. 2A-C.

Assuming, for purposes of illustration, that the selector control lever is in FORWARD position, hydraulic fluid under pressure passes from control valve 22 via line 23, flow rate indicator 25, and lines 27, 28 and 29 to the rear wheel motors 31 and 32, and via lines 23, 33, front wheel recirculating valve 26 and lines 34 and 35 to the front wheel motors 36 and 37. In the preferred embodiment of the present inventon, the wheel motors 31, 32, 36 and 37 are preferably fixed displacement hydraulic machines of the type described in greater detail in connection with FIGS. 3-5 of the drawings. It will be appreciated, however, that variable displacement hydraulic wheel motors may be employed within the spirit and scope of the present invention.

The hydraulic fluid from the rear wheel motors 31 and 32 returns via lines 41, 42, 43 and 24 through main control valve 22 and line 44 to the variable displacement pump 21. the hydraulic fluid from front wheel motors 36 and 37 returns via lines 46 and 47 through front wheel recirculating valve 26 and, via lines 48 and 24, through main control valve 22 and line 44 to variable displacement pump 21, thus completing a closed circuit for the hydraulic fluid.

It will be apparent that, if the selector control lever 101 (FIG. 2A–C) iS in REVERSE position, the high pressure hydraulic fluid will pass from main control valve 22 via lines 24, 43, 42 and 41 to the rear wheel motors 32 and 31, and via lines 24, 48, 47 and 46 to the front wheel motors 37 and 36. In this case, lines 29, 28, 27, flow rate indicator 25 and lines 23 and 44 as the return path for the hydraulic fluid from the rear wheel motors 31 and 32 to the variable displacement pump 21, while the lines 35, 34, front wheel recirculating valve 26 and lines 33, 23 and 44 provide the return path for the hydraulic fluid from front wheel motors 36 and 37 to the variable displacement pump 21.

According to the preferred form of the present invention, braking is accomplished by means of brake valves in the return lines between each of the wheel motors and the variable displacement pump 21. For example, if the vehicle is moving forward, braking is accomplished by brake valves 51 and 52 which are located in the return lines 41 and 42 from rear wheel motors 31 and 32 respectively, and by brake valves 56 and 57 located in the return lines 46 and 47 from front wheel motors 36 and 37 respectively. Similarly, if the vehicle is moving backward, braking is accomplished by brake valves 54 and 55 located in the return lines 34 and 35 from front wheel motors 36 and 37 respectively, and by brake valves 58 and 59 located in return lines 28 and 29 from rear wheel motors 31 and 32 respectively.

Although the preferred embodiment of the present invention includes a separate brake valve for each wheel motor, it will be appreciated that the braking function could be accomplished by "forward" brake valves in lines 43 and 48 and "reverse" brake valves in lines 27 and 33 or by a single "forward" brake valve in line 24 and a single "reverse" brake valve in line 23.

Briefly, the desired braking effect is accomplished by the degree of closing the appropriate brake valves so as to create back pressure on the wheel motors which, it will be remembered, act as pumps when the vehicle is decelerating. The appropriate selection of the forward braking valves 51, 52, 56 and 57 or the rear braking valves 54, 55, 58 and 59 is accomplished by a flow direction indicator 61 and a braking control system shown in detail in FIGS. 13 and 14. The flow direction indicator 61 is preferably located in one of the hydraulic lines connected to the rear wheel motors 31 and 32 and simply serves to indicate whether the vehicle is moving in a forward or rearward direction. The operation of the braking control system brake valves and flow direction indicator will be explained in detail in connection with FIGS. 13 – 16.

Overload valves 62, 63, 64 and 65 which may be of a commercially available type, are provided between the pairs of hydraulic lines serving each of the wheel motors 31, 32, 36 and 37, in order to prevent possible damage to the system due to excessive back pressure resulting from unusual road conditions during braking. For example, if one wheel should strike a bump or pothole during severe braking, a large pressure impulse might be generated at the outlet of the wheel motor which, as explained above, acts as a pump when the vehicle is decelerating. In order to prevent such a pressure impulse from damaging the system, each of the overload valves 62, 63, 64 and 65 serves to limit the pressure differential between the two hydraulic lines serving its associated wheel motor to a predetermined level such as, for example, 3000 p.s.i. If the back pressure in one or more or the return lines 41, 42, 46 and 47 exceeds the pressure on feed lines 28, 29, 34 and 35 by more than 3000 p.s.i. one or more of the overload valves 62, 63, 64 and 65 will operate to allow hydraulic fluid to pass from the return line 41, 42, 46 and 47 to their associated feed lines 28, 29, 34 and 35 respectively thus relieving the excessive pressure.

It will be appreciated, however, that in the preferred embodiment of the present invention the pressure settings of the overload valves 62, 63, 64 and 65 would be sufficiently high that the overload valves would not be operated under normal road conditions even if the braking force were sufficient to lock the wheels of the vehicle.

In addition, a plurality of check valves 71 – 80 are provided in order to prevent the pressure in the main hydraulic circuit from falling below a predetermined level, such as for example 150 p.s.i. Excessively low pressure in the main hydraulic circuit might cause bubbles to form in the hydraulic fluid as a result of cavitation or as a result of air being drawn into the system to one or more of the many air-fluid seals in the system. For example, if the vehicle is moving forward at a relatively high rate of speed and the brakes are applied, the pressure in one or more of the feed lines 27, 28, 29, 33, 34 and 35 may drop substantially. If, for example, the pressure in line 27 drops below the predetermined level (150 p.s.i.), fluid from low pressure line 82 will pass through check valve 75 to line 27, thus maintaining the pressure in line 27 at a minimum of 150 p.s.i., and thereby preventing the formation of bubbles. Similarly, if the pressure in line 28 should drop below the predetermined low pressure level, hydraulic fluid would pass from the low pressure line 82 through the check valve 72 to line 28. The other check valves 71 – 80 operate in a similar manner under various conditions as will be apparent to those skilled in the art. The check valves 71 – 80 may be of a conventional commercially available type.

The preferred embodiment of the present hydraulic power transmission and braking system also includes a scavenging system for recovering the hydraulic fluid which unavoidably leaks from the hydraulic wheel motors 31, 32, 36 and 37 and the variable displacement pump 21. The hydraulic fluid is collected via line 83 at near atmospheric pressure and fed to a suitable reservoir 84 from whence it is passed through a filter 85 to a pump 86 which pumps the scavenged hydraulic fluid into the low pressure line 82. A pressure regulator 87, which may be of conventional design, controls the pressure differential (preferably about 150 p.s.i.) between the scavenging line 83 and the low pressure line 82. An accumulator 88 is provided in the low pressure line 82 to serve as a buffer between the check valves 71 – 80 and the pump 86. It will be apparent to those skilled in the art that the hydraulic fluid scavenged from the high pressure circuit by the scavenging line 83 is returned to the main high pressure circuit via the pump 86, low pressure line 82, and the check valves 71 – 80, thus ensuring that the high pressure circuit will be properly filled with hydraulic fluid at all times despite the inevitable leakage in the wheel motors 31, 32, 36 and 37 and the variable displacement pump 21.

THE CONTROL MECHANISM

Referring to FIGS. 2A, 2B and 2C of the drawings, there is shown a diagram of a preferred embodiment of the control mechanism of the present hydraulic power transmission and braking system. More particularly, FIG. 2A shows the control mechanism in the NEUTRAL condition, FIG. 2B shows the control mechanism in the FORWARD condition, and FIG. 2C shows the control mechanism in the REVERSE condition. Although FIGS. 2A-C show an embodiment of the control mechanism in which the necessary functions are performed primarily by a particular arrangement of mechanical links, it will be appreciated by those skilled in the art that other arrangements of mechanical links or electromechanical devices or electronic circuits or fluid logic devices or the like may be employed to perform the necessary control functions within the spirit and scope of the present invention.

Referring in detail to FIG. 2A of the drawings, there is shown a diagram of the control mechanism in the NEUTRAL condition. The selector control lever 101 is shown in the NEUTRAL position which causes an electrical circuit to be established through contact 102A mounted on gear lever 101, stationary contact 102B, and wire 103 to energize the coil 104A of "neutral" solenoid 104. The energization of solenoid coil 104A moves the solenoid plunger 104B to the right, as shown in FIG. 2A, so as to operate pincers 105 about fixed pivot pin 106, thus causing the jaws 105A and 105B to locate movable pin 107 at a predetermined central position.

The centralization of pin 107 serves to centralize pilot valve member 108 which in turn centralizes main control valve member 109 of main control valve 22. The centralized position of pilot valve member 108 serves to block the low pressure (150 p.s.i.) hydraulic fluid in passage 111 from flowing via passage 113 to the upper portion 114 of the main valve chamber or via passage 116 to the lower portion 117 of the main valve chamber.

The centralized position of main control valve member 109 allows the hydraulic fluid from the pump 21 via conduit 20 to circulate via passages 122 and 123 or via passages 125 and 126 in main control valve block 112 back to the pump 21 via conduit 44. Similarly, the hydraulic lines 23 and 24 connecting the main control valve 22 to the wheel motors 31, 32, 36 and 37 are each connected simultaneously to the outlet of pump 21 via conduit 20 and the intake of pump 21 via conduit 44. Thus, when the main control valve member 109 is in the neutral position as shown in FIG. 2A, the hydraulic wheel motors 31, 32, 36 and 37 of the vehicle are effectively decoupled from the hydraulic pump 21 by reason of the free circulation of hydraulic fluid within the main control valve block 112.

In the embodiment shown in FIGS. 2A–C, the flow rate indicator 25 includes a tapered passage 131 which is located in the high pressure hydraulic fluid circuit between the pump 21 and the rear wheel motors 31 and 32 as explained in connection with FIG. 1A. A movable member 132 having a suitable bulge 132A is disposed for longitudinal movement within passage 131 and is preferably biased toward the small end of passage 131 by a suitable compression spring 133. The position of movable member 132 within passage 131 is affected by the rate of flow of the hydraulic fluid which acts on the bulge 132A to move the movable member 132 toward the large end of passage 131 against the force of compression spring 133. Because the rate of flow of hydraulic fluid through passage 131 is determined by the rate of flow of hydraulic fluid through rear wheel motors 31 and 32, it will be appreciated that the position of movable member 132 within passage 131 is proportional to vehicle speed.

Assuming that the vehicle is at rest so that there is no flow of hydraulic fluid through passage 131, movable member 132 will be in its lowermost or "standstill" position as indicated by line 134 shown in FIG. 2A. In this position, an electrical circuit is established between electrical contact member 135 mounted on movable member 132 and electrical contact member 136 mounted on link 167, thus energizing coil 137A of solenoid 137. The plunger 137B of solenoid 137 is connected to the pilot valve member 138 of front wheel recirculating valve 26, so that, when solenoid coil 137A is energized, pilot valve member 138 is moved to its upper position thus allowing hydraulic fluid from the low pressure (150 p.s.i.) system to flow via passages 141 and 142 to the upper portion 143A of the valve chamber, thus causing the valve member 144 to move to its lower position, as shown in FIG. 2A, thereby connecting hydraulic fluid conduits 33 and 48 from main control valve 22 to conduits 147 and 148, respectively, which are connected to the front wheel motors 36 and 37 of the vehicle.

Referring now to FIG. 2B of the drawings, there is shown a diagram of the control apparatus of the present hydraulic power transmission and braking system with the selector level 101 in the FORWARD position and the vehicle moving at relatively high speed. When the lever 101 is moved from the NEUTRAL position shown in FIG. 2A to the FORWARD position shown in FIG. 2B, the electrical circuit between contacts 102A and 102B is broken, thus deenergizing coil 104A of solenoid 104, thereby allowing plunger 104B to be retracted by the action of tension spring 104C, thus causing the jaws 105A and 105B of pincers 105 to open, thereby freeing pin 107 for movement. It will be understood, however, that, initially, when the vehicle is at a standstill and before the accelerator control pedal 151 is depressed, there will be little or no motion of pin 107 when it is released by pincers 105.

The accelerator control pedal 151 is pivotally mounted on a fixed pin 152 and connected by a link 153 to the throttle 154 of the vehicle's engine which drives the hydraulic pump 21 as explained above in connection with FIG. 1A. When the accelerator control pedal 151 is depressed, as shown in FIG. 2B, the throttle 154 is opened thus applying power to the hydraulic pump 21 which is connected via conduits 20 and 44 to the main control valve 22.

Accelerator pedal 151 is also connected by a pin 155 to a link 156 which is connected to the link 157 by means of the pin 158 mounted on link 156 which engages the scissors coupling arrangement 159 mounted on link 157. One end of link 157 is connected by a pin 161 to the valve member 132 of flow rate sending valve 25 while the other end of link 157 is connected by links 162 and 163 to the pilot valve member 108 and main valve member 109 of main control valve 22.

Briefly, when accelerator control pedal 151 is depressed, its motion is transmitted via link 153 to open the throttle 154 of the engine, thus applying power to the hydraulic pump 21. At the same time, the motion of pedal 151 is transmitted through link 156 and scissors coupling arrangement 159 to link 157, thus causing link 157 to pivot around pin 162. The downward motion of the opposite end of link 157 is transmitted through links 162 and 163 to the pilot valve member 108 of main control valve 22.

As the pilot valve member 108 moves downward, the low pressure (150 p.s.i.) line 111 is connected to passage 116 within valve block 112, thus admitting hydraulic fluid to the lower portion 117 of the valve chamber and thereby causing the main valve member 109 to move upward. As the valve member 109 moves upward, the outlet conduit 20 from the hydraulic pump 21 is gradually connected via passage 122 to the hydraulic line 23 which is connected to the wheel motors. At the same time, hydraulic line 24 from the wheel motors is gradually connected via passage 126 to the return conduit 44 to the hydraulic pump 21 thus establishing a circuit for the high pressure hydraulic fluid so as to drive the vehicle in the forward direction.

It will be appreciated that, as main control valve member 109 moves upward, its motion is coupled through link 163 to pilot valve member 108, thus tending to centralize the pilot valve member 108 which in turn has the effect of stabilizing the position of main control valve member 109. As a result of this followup relationship between main valve member 109 and pilot valve member 108, the position of main valve member 109 may become stabilized at a position somewhere between the NEUTRAL position shown in FIG. 2A and the fully raised (or FORWARD) position shown in FIG. 2B if the accelerator control pedal 151 is less than fully depressed. However, if the accelerator pedal 151 is fully depressed, it will be found that the main control valve member 109 will move to its fully raised (or FORWARD) position shown in FIG. 2B.

It will be appreciated that, when the vehicle is at a standstill, the flow rate of the hydraulic fluid from the hydraulic pump 21 through the wheel motors 31, 32, 36 and 37 and back to the hydraulic pump 21 is zero. As the vehicle begins to move forward, hydraulic fluid begins to flow through the wheel motors, and, as the speed of the vehicle increases, the hydraulic fluid flow rate increases in direct proportion. In the preferred form of the present invention the increasing hydraulic fluid flow rate is capable of being supplied by the automatically increasing displacement of the hydraulic pump 21 while the speed of the pump 21 can remain approximately constant at a level corresponding, for example to the speed at which the vehicle's engine achieves its maximum power output.

More specifically, in the preferred embodiment of the present invention the variable displacement hydraulic pump 21 is coupled directly to the vehicle's engine so that the speed of the pump 21 is determined by the speed of the engine which responds substantially immediately to the throttle which is controlled by the vehicle operator. For example, if the operator decides to use maximum power to accelerate from a standstill, he opens the throttle thus causing the engine and pump 21 to quickly speed up to full speed while the vehicle, because of its inertia, barely begins to move forward. Under such conditions the automatic displacement control mechanism of the pump 21 operates to reduce the displacement of the pump so as to produce a low hydraulic fluid flow rate commensurate with the slow speed of the wheel motors and to produce the maximum output pressure so as to deliver maximum torque to the wheels. As the vehicle accelerates, the automatic displacement control mechanism of the pump 21 operates to increase the displacement of the pump 21 and correspondingly reduce its output pressure so as to continue to deliver maximum power to the wheels through a range of vehicle speeds while the speed of the vehicle's engine and pump 21 remain approximately constant at the maximum power output level.

It will be appreciated that, if the operator does not wish to use maximum power, he will only partially open the throttle resulting in a somewhat lower engine and pump speed. The displacement control mechanism of the pump 21 will automatically adjust the displacement of the pump 21 to coordinate the engine speed to the wheel speed.

Referring again to FIG. 2B of the drawings, it will be seen that the flow rate of hydraulic fluid through tapered passage 131 of flow rate indicator 25 will increase in direct proportion to the increasing forward speed of the vehicle. The increasing fluid flow rate causes the increasing upward pressure on bulge 132A of member 132, thus causing the movable member 132 to move upward against the force of compression spring 133. The tapered contour of passage 131 allows the movable member 132 to find an equilibrium position corresponding to the hydraulic fluid flow rate which in turn corresponds to the vehicle's speed.

The upward movement of movable member 132 is transmitted through pin 161 to link 157 which pivots about pin 158 and thus causing the opposite end of link 157 to move downward. The downward movement of the opposite end of link 137 is transmitted to links 162 and 163 to the pilot valve member 108 which operates to further raise main control valve member 109 thus increasing the flow of hydraulic fluid to the wheel motors via passage 122 and hydraulic line 23.

As the speed of the vehicle increases through the low end of the speed range, the valve member 132 continues to rise within the passage 131 of flow rate sending valve 25, but electrical contact member 135 remains in contact with electrical contact member 136 so that solenoid coil 137A remains energized so that hydraulic fluid from the pump 21 continues to be transmitted through front wheel recirculating valve 26 to the front wheel motors 36 and 37 of the vehicle. However, as the speed of the vehicle increases beyond a predetermined value, such as for example, the half-speed point, movable member 132 of flow rate sending valve 25 rises to a point where the contact between electrical contact members 135 and 136 is broken, as shown in FIG. 2B, thus deenergizing the solenoid coil 137A, thus allowing the compression spring 155 to move the solenoid plunger 137B and pilot valve member 138 to their downward position as shown in FIG. 2B. The downward position of pilot valve member 138 allows hydraulic fluid from the low pressure (150 p.s.i.) system to flow through passages 141 and 156 to the lower portion 143B of the valve chamber, thus causing the main valve member 144 of front wheel recirculating valve 26 to move to its upward position as shown in FIG. 2B.

When the valve member 144 is in its upward position, the hydraulic conduits 33 and 48, which are connected to control valve 22, are blocked by portions 144A and 144B, respectively, of valve member 144. At the same time, the passage 147 and 148, which are connected to the front wheel motors 36 and 37, are connected together through the central portion 143C of the valve of chamber, thus allowing the hydraulic fluid which moves through the front wheel motors 36 and 37 as a result of the vehicle motion to simply recirculate through the valve 26. Thus, the operation of front wheel recirculating valve 26 when the vehicle reaches the half-speed point serves to automatically convert the mode of operation of the present hydraulic power transmission system from 4-wheel drive to 2-wheel drive.

One effect of the conversion of the mode of operation of the present hydraulic power transmission system from 4-wheel drive to 2-wheel drive is to reduce by one-half the total displacement of the hydraulic wheel motors connected to the variable displacement hydraulic pump 21. At the same time, the torque reaction on the rear wheel hydraulic motors 31 and 32, which remain connected to the variable displacement pump 21, is approximately doubled because the entire force of acceleration, which was formerly distributed between all four wheels, must now be supplied by the rear wheels alone. As a result, the back pressure of the rear wheel hydraulic motors 31 and 32, as seen by the variable displacement hydraulic pump, is approximately doubled.

It will be appreciated that the new conditions of pressure and displacement caused by the conversion from 4-wheel drive to 2-wheel drive will cause the variable displacement hydraulic pump 21 to automatically reduce its displacement by one-half and correspondingly double its output pressure as will be explained in greater detail in connection with FIGS. 6-12. After conversion from 4-wheel drive to 2-wheel drive, the vehicle will continue to accelerate, and the displacement of the variable displacement hydraulic pump 21 will continue to increase until the vehicle reaches full speed, at which point the movable member 132 of flow rate indicator 25 will be in its fully raised position as shown in FIG. 2B.

In the preferred form of control linkage shown in FIGS. 2A-C, the electrical contact 136 is mounted on a link 167 which is connected by links 168 and 169 to the accelerator control pedal 151. The function of links 167, 168 and 169 is to adjust the position of electrical contact 136 so that conversion from 4-wheel drive to 2-wheel drive will occur at a vehicle speed which is approximately equal to half the final speed which will be reached for a particular position of the accelerator control pedal 151. For example, if the accelerator pedal 151 if fully depressed, the final speed of the vehicle will be its maximum speed, and conversion from 4-wheel drive to 2-wheel drive will occur at approximately half maximum speed. On the other hand, if the accelerator pedal 151 is depressed only halfway, the final speed of the vehicle will be approximately half of its maximum speed, and conversion from 4-wheel drive to 2-wheel drive will occur at approximately one-quarter of maximum speed.

It will be appreciated that, as a vehicle equipped with the present hydraulic power transmission system decelerates from a cruising speed, low rate indicator 25 will operate to automatically convert the vehicle from 2-wheel drive back to 4-wheel drive at a speed which is determined by the position of the accelerator control pedal 151.

Referring now to FIG. 2C of the drawings, there is shown a diagram of the control apparatus in the REVERSE condition. The movable member 132 of flow rate indicator 25 is in its lowest position, corresponding to a zero flow or a reverse flow of hydraulic fluid through passage 131, so that stop 171 mounted on movable member 132 contacts L-shaped line 172 which pivots about a fixed pin 173 and is connected at its opposite end to a link 174 which is connected by a tension spring 175 to link 176 which is connected to the selector level 101. When movable member 132 is in its lowest position, as shown in FIG. 2C, stop 171 causes L-shaped link 172 to be rotated in the counterclockwise direction about pin 173, thereby drawing links 174 and 176 to the left against the action of tension spring 177, thereby causing the lower end 176a of link 176 to clear fixed pin 178, so that, when selector level 101 is moved to the REVERSE position as shown in FIG. 2C, the end 176a of link 176 bears against L-shaped link 181 and causes it to pivot in the clockwise direction about the fixed pin 182 against the action of tension spring 184. The motion of L-shaped link 181 is transmitted by link 183 to link 156 thus causing pin 155 which is mounted on link 156 to move to the left end 185a of slot 185 in accelerator control pedal 151 as shown in FIG. 2C.

It will be appreciated that, if the movable member 132 of flow rate indicator 25 is not in its lowest position as shown in FIG. 2C, selector lever 101 will not be able to move to the REVERSE position, because end 176a of link 176 will bear against the stationary pin 178 rather than L-shaped link 181. Hence, the effect of stop 171 on L-shaped link 172 insures that the present hydraulic transmission system cannot be put into the REVERSE condition while the vehicle is moving forward.

When the control apparatus of the present hydraulic power transmission system is in the REVERSE condition, as shown in FIG. 2C, and the accelerator control pedal 151 is depressed, link 156 moves upward, thus causing link 157 to pivot in a clockwise direction about pin 161. The resulting upward motion of the opposite end of link 157 is transmitted through links 152 and 153 to the pilot valve member 108 of main control valve 22. When the pilot valve member 108 is moved to its raised position, as shown in FIG. 2C, hydraulic fluid from the low pressure (150 p.s.i.) system flows through passages 111 and 113 to the upper portion 115 of the main valve chamber, thus causing the main valve member 109 to move downward. It will be appreciated that the downward movement of main valve member 109 is coupled through line 163 to pilot valve member 108, thus tending to centralize the position of pilot valve 108.

When the main control valve member 109 is in its lower (or REVERSE) position as shown in FIG. 2C, high pressure hydraulic fluid from the variable displacement pump flows through conduit 20, passage 125 and conduit 24 to the hydraulic wheel motors, while hydraulic fluid returning from the wheel motors via line 23 flows through passage 123 and conduit 44 back to the intake side of the variable displacement hydraulic pump 21. Thus it is seen that the operation of the main control valve 22 serves to direct hydraulic fluid to the wheel motors via hydraulic line 24, with the return flow being carried by hydraulic line 23 when the selector lever 101 is in the REVERSE position as shown in FIG. 2C, while hydraulic fluid is directed to the wheel motors via line 23 with the return flow being carried by line 24 when the selector lever 101 is in the FORWARD position, as shown in FIG. 2B.

Although the control apparatus illustrated in FIGS. 2A-C uses the hydraulic fluid flow rate indicator 25 to effect switching between 4-wheel drive and 2-wheel drive, it will be appreciated that order types of devices may be used to perform this function. For example, switching between 4-wheel and 2-wheel drive might be accomplished by a conventional mechnical governor device coupled to the wheels of the vehicle.

THE HYDRAULIC WHEEL MOTORS

Figure 3:
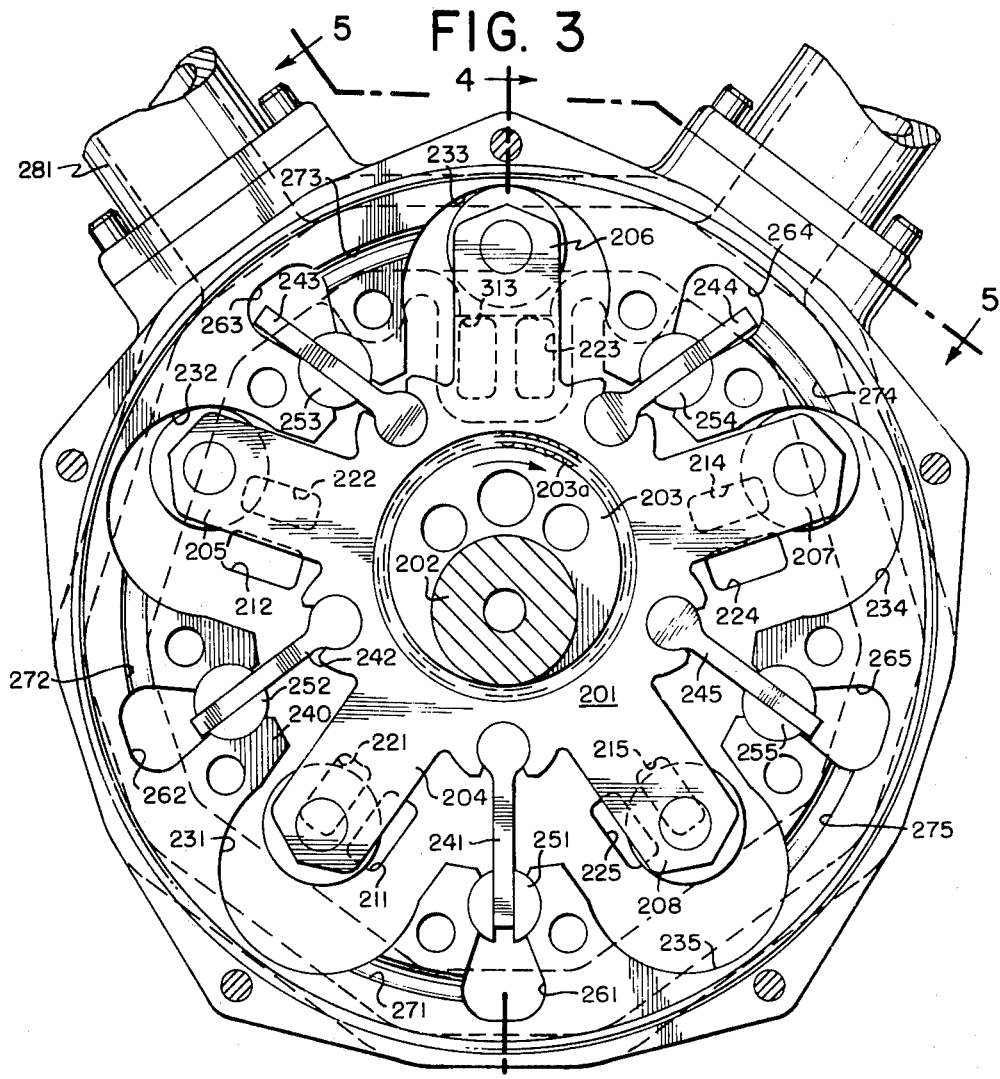
FIG. 3 is a cross-sectional view of a preferred form of the hydraulic wheel motor used in the hydraulic power transmission and braking system of the present invention.
Figure 9:
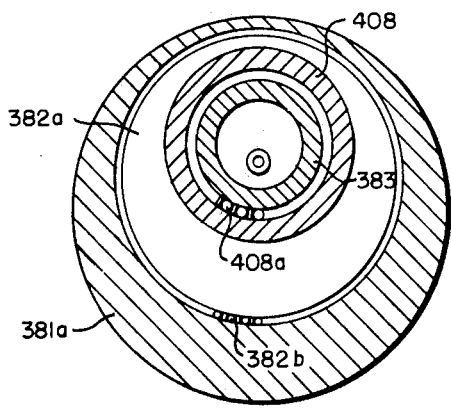
FIG. 9 is a cross-sectional view of the variable displacement hydraulic pump taken along the line 9—9 of FIG. 7 showing the inner and outer eccentric carriers which control the displacement of the hydraulic pump.

Referring to FIG. 3 of the drawings, there is shown a cross-sectional view, taken in a plane perpendicular to the axis of rotation of one of the fixed displacement hydraulic wheel motors used in the preferred form of the present hydraulic power transmission and braking system. The hydraulic motor of FIG. 3 is of the type in which the driven element is in the form of an orbiting spider, generally designated 201, which is eccentrically mounted on a driven shaft 202. The legs 204, 205, 206, 207 and 208 of the spider 201 perform several functions including (a) covering and uncovering the inlet ports 211, 212, 213, 214 and 215 and the outlet ports 221, 222, 223, 224 and 225 in the proper sequence, and (b) preventing the spider 201 from rotating and thus constraining it to orbital motion.

The hydraulic wheel motor of the FIG. 3 includes a cylindrical casting 230 which includes castings 238 and 239 and circumferential member 240. Cylindrical casing 230 has five circumferentially spaced chambers 231, 232, 233, 234 and 235 which change in size as the spider 201 orbits about the shaft 202. Each of the chambers 231-235 is bounded by a portion of the spider 201, portions of the opened end surfaces 236 and 237 of castings 238 and 239 (shown more clearly in FIG. 4), a portion of the circumferential member 240 and two of the movable vanes 241, 242, 243, 244 and 245. The vanes 241-245 form seals between the chambers 231-235 of the hydraulic motor shown in FIG. 3. For example, chamber 231 is separated from chamber 235 by vane 241, and separated from chamber 232 by vane 242.

In the preferred form of hydraulic motor shown in FIG. 3, the inner ends of vanes 241-245 are mounted to the spider 201 by a "cylinder and socket" arrangement which permits the vane to pivot from side to side with respect to the spider 201 while maintaining a reasonable good fluid seal between the vane and the spider. The outer ends of the venes 241-245 are movably mounted to the circumferential casing 240 by means of split cylinders 251, 252, 253, 254 and 255 respectively. Small cavities 261, 262, 263, 264 and 265 are provided in circumferential casing 240 to allow free movement of the outer ends of vanes 241-245 as the spider 201 orbits around shaft 202. Passages 271, 272, 273, 274 and 275 connecct cavities 261-265 to chambers 231-235 to relieve the pumping pressure caused by the movement of the outer ends of vanes 241-245 within the cavities 262-265 as the spider 201 orbits the shaft 202.

Figure 4:
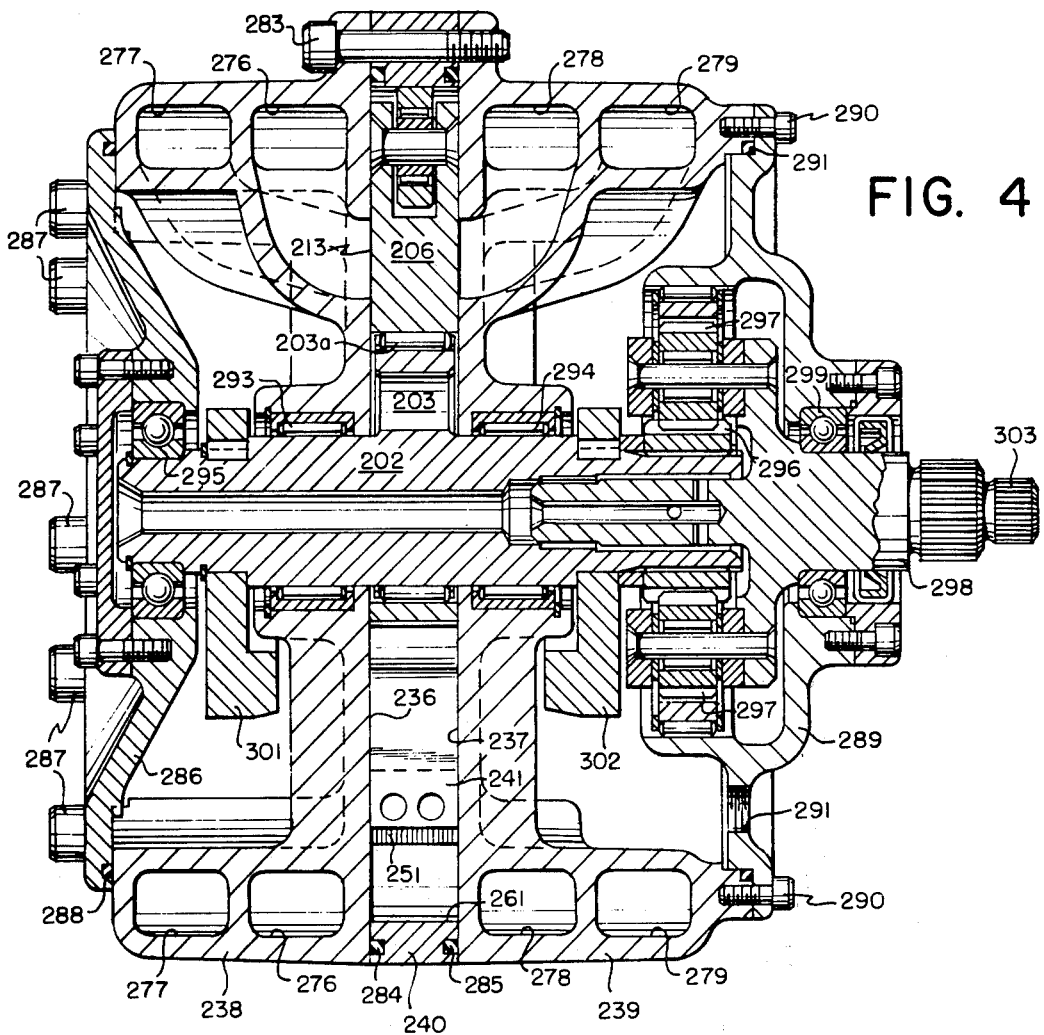
FIG. 4 is a cross-sectional view of the hydraulic wheel motor taken along the line 4—4 of FIG. 3.

Referring now to FIG. 4 of the drawings which shows a cross-sectional view of the preferred form of hydraulic wheel motor taken along the line 4—4 of FIG. 3, it will be seen that all of the inlet ports 211-215 of FIG. 3 are connected together by a manifold arrangement within casting 238. More specifically, all of the inlet ports 211-215 are connected to a circumferential passage 276 within casting 238. Similarly, all of the outlet ports 221-225 of FIG. 3 are connected to the circumferential passage 277 within casting 238. Similarly, the inlet openings in surface 237 of casting 239 are connected by the circumferential passage 278, and the outlet openings in surface 237 of casting 239 are connected by the circumferential casting 279. It will be appreciated that the inlet openings in surface 237 of casting 239 are located opposite the inlet openings 211-215 in the surface 236 of casting 238, and the outlet openings in the surface 237 of casting 239 are located opposite the outlet openings 211-225 in the surface 236 of casting 238.

Figure 5:
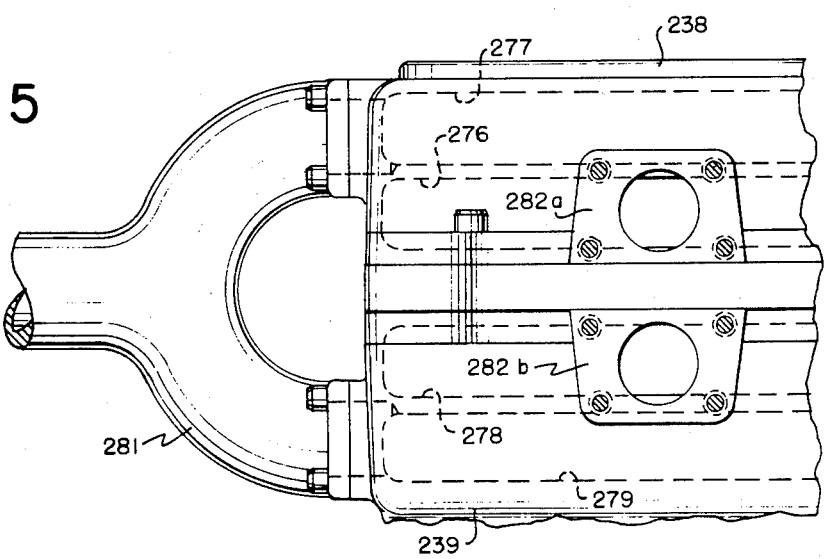
FIG. 5 is a cross-sectional view of the exhaust and intake manifolds of the hydraulic wheel motor taken along the line 5—5 of FIG. 3.

Referring to FIG. 5 which is a cross-sectional view taken along the line 5—5 in FIG. 3, it will be seen that the circumferential outlet passage 277 in casting 238 is connected to the circumferential outlet passage 279 in casting 239 by a suitable "Y" coupling 281 while the circumferential inlet passage 276 in casting 238 is connected to the circumferential inlet passage 278 in casting 239 by a similar "Y" coupling 282 (shown in FIG. 3) which is connected to the coupling point 282A and 282B shown in FIG. 5. Thus, Y coupling 281 serves to connect all the outlet ports in the hydraulic wheel motor to a single hydraulic line while the Y coupling 282 serves to connect all the inlet ports in the hydraulic wheel motor to a single hydraulic line.

Assuming that the hydraulic wheel motor will drive the vehicle in the forward direction when the high pressure hydraulic line from the variable displacement pump 21 (FIG. 1) is connected to the inlet ports of the hydraulic motor of FIGS. 3-5 via the Y coupling 282 and the return hydraulic line to the variable displacement pump 21 is connected to the outlet ports of the hydraulic motor via the Y coupling 281, it will be appreciated that the motor of FIGS. 3-5 can be made to drive the vehicle in the reverse direction simply by connecting the high pressure line from the pump 21 to Y coupling 281 and connecting the return line to the pump 21 to the Y coupling 282. This reversing action is accomplished by the main control valve 22 described in connection with FIGS. 1 and 2A-C.

Referring again to FIG. 4 of the drawings, it will be seen that, in the preferred embodiment, the castings 238 and 239 and the circumferential member 240 are held together by means of suitable fastening devices such as, for example, bolts 283. "O-ring" seals 284 and 285 are provided between circumferential member 240 and castings 238 and 239 in order to prevent leakage of hydraulic fluid. An end plate 286 is fastened to casting 238 by means of suitable fastening devices such as bolts 287, and an O-ring seal 288 is provided between end plate 286 and casting 238 to prevent hydraulic fluid leakage. A ring gear carrier 289 is mounted on casting 239 by means of suitable fastening devices such as for example bolts 290, and again an O-ring seal 291 is provided to prevent hydraulic fluid leakage.

Mechanical torque is transmitted from the orbiting spider 201 through the eccentric 203 to the shaft 202 which is rotatably mounted within castings 238 and 239 by means of roller bearings 293 and 294 respectively. One end of shaft 202 is rotatably mounted to end plate 286 by a thrust bearing 295 while the other end of shaft 202 carries a sun gear 296 which engages planetary gears 297 which are rotatably mounted on a planetary gear carrier 298 which is rotatably mounted with ring gear carrier 289 by a suitable ball bearing 299. A pair of counter-weights 301 and 302 are splined to shaft 202 to counter balance the eccentric mass of the spider 201. The vehicle wheeel is connected to the end of shaft 303 projecting from the planetary gear carrier 298. Port 304 permits hydraulic fluid to be scavenged from the spaced within the hydraulic motor of FIGS. 3-5.

Briefly, the operation of the preferred form of the hydrulic wheel motor shown in FIGS. 3-5 is as follows.

Hyraulic fluid under pressure enters chambers 231 and 232 through inlet ports 211 and 212 respectively. The pressure in chambers 231 and 232 tends to drive the spider 201 in the clockwise direction thus driving the shaft 202 through eccentric 203. As the spider 201 moves in the clockwise direction, the volume of chambers 234 and 235 is reduced thus causing hydraulic fluid to flow out through outlet ports 224 and 225 respectively. At the same time, leg 206 of spider 201 begins to uncover inlet port 213 of chamber 233 while leg 204 of spider 201 begins to cover both inlet port 211 and outlet port 221 of chamber 231.

When the inlet port 211 of chamber 231 is closed by let 204 and the inlet port 213 of chamber 233 is open, the high pressure in chambers 232 and 233 will continue to move the spider 201 in the clockwise direction. It will be apparent that further clockwise orbital motion of spider 201 will continue to cover and uncover inlet and outlet ports in the proper sequence to bring about the continued clockwise orbiting of the spider 201 with the motion of the spider 201 being transmitted to the shaft 202 through the eccentric 203. Referring now to FIG. 4 of the drawings, it will be seen that the rotation of shaft 202 causes the sun gear 296 to drive the planetary gears 297 which are mounted on the planetary gear carrier 298. In the preferred embodiment of the present invention, the planetary gear arrangement accomplishes a 3:1 speed reduction between the shaft 202 and the shaft 303 which is connected to the vehicle wheel.

THE VARIABLE DISPLACEMENT HYDRAULIC PUMP

Figure 6:
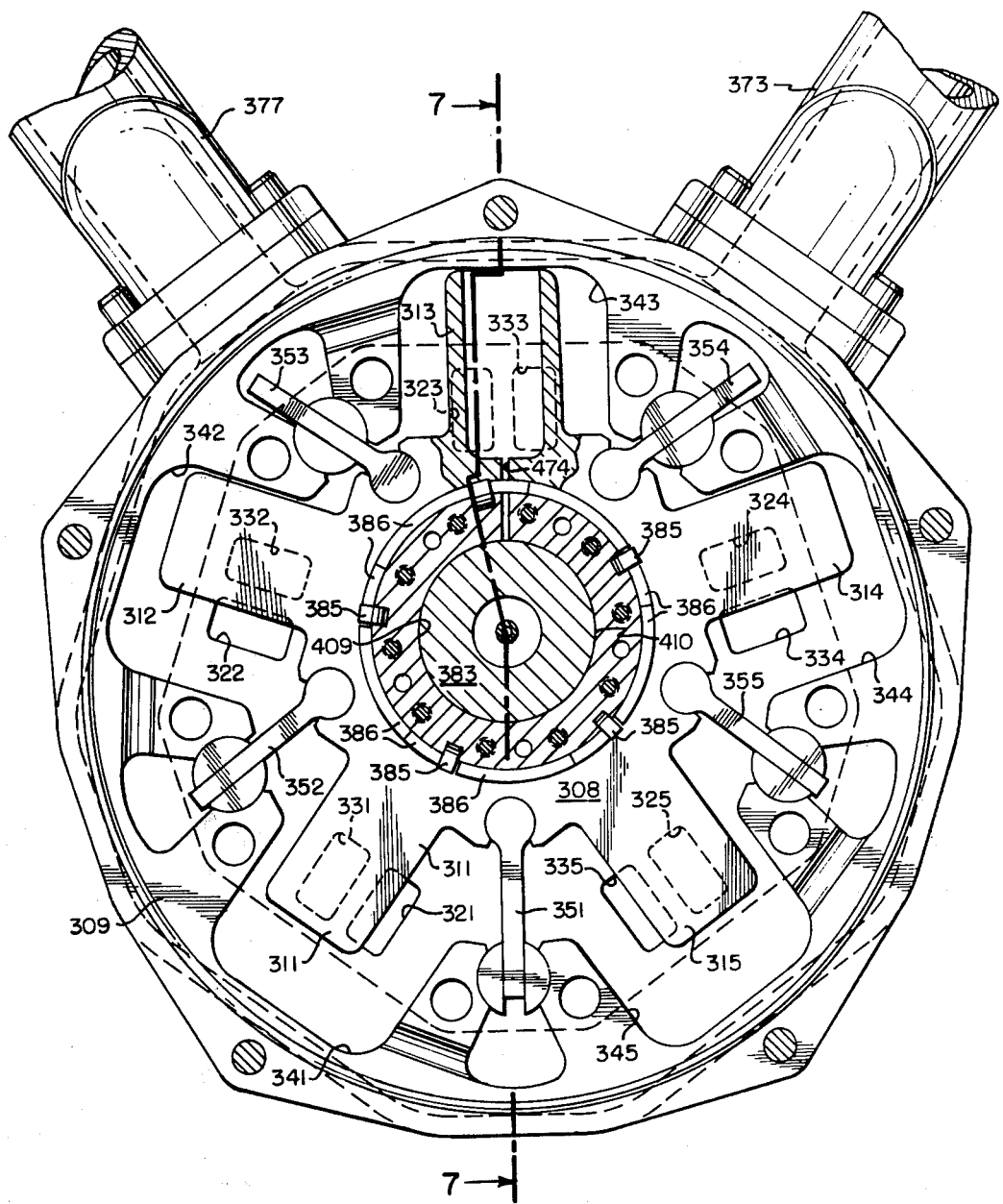
FIG. 6 is a cross-sectional view of a preferred embodiment of the variable displacement hydraulic pump used in the hydraulic power transmission and braking system of the present invention.

Referring now to FIG. 6 of the drawings, there is shown a cross-sectional view, taken in a plane perpendicular to the axis of rotation, of the preferred form of variable displacement hydraulic pump 21 used in the hydraulic power transmission and braking system of the present invention. Comparing the hydraulic pump 21 of FIG. 6 with the hydraulic motor of FIG. 3, it will be apparent that there are certain similarities of structure. For example, the variation displacement hydraulic pump of FIG. 6 includes a spider 308 mounted for clockwise eccentric orbital movement with a cylindrical casing 307. The spider 308 has five legs 311-315 which serve to cover and uncover inlet ports 321-325 and outlet ports 331-335 in the proper sequence. The pumping chambers 341-345 are separated by movable vanes 351-355.

It will be appreciated, however, that the variable displacement hydraulic pump 21 of FIG. 6 differs in certain important respects from the fixed displacement hydraulic motor of FIG. 3. More particularly, the apparatus of FIG. 6 operates as a pump rather than as a motor. That is, the spider 308 is driven by a suitable prime mover, such as for example an internal combustion engine, to cause hydraulic fluid to be drawn in through inlet ports 321-325 and expelled through outlet ports 331-335. Second, the pump 21 of FIG. 6 is a variable displacement device, the displacement of which is controlled by the degree of eccentricity of the orbital movement of spider 308 within the casing 307. The displacement of the hydraulic pump of FIG. 6 is greatest when the degree of eccentricity of spider 308 is greatest, and the displacement of the pump is least when the degree of eccentricity of spider 308 is least. It will be appreciated by those skilled in the art that, for a constant power input from the prime mover, the output pressure of the variable displacement hydraulic pump 21 of FIG. 6 will be inversely proportional to its effective displacement.

Figure 7:
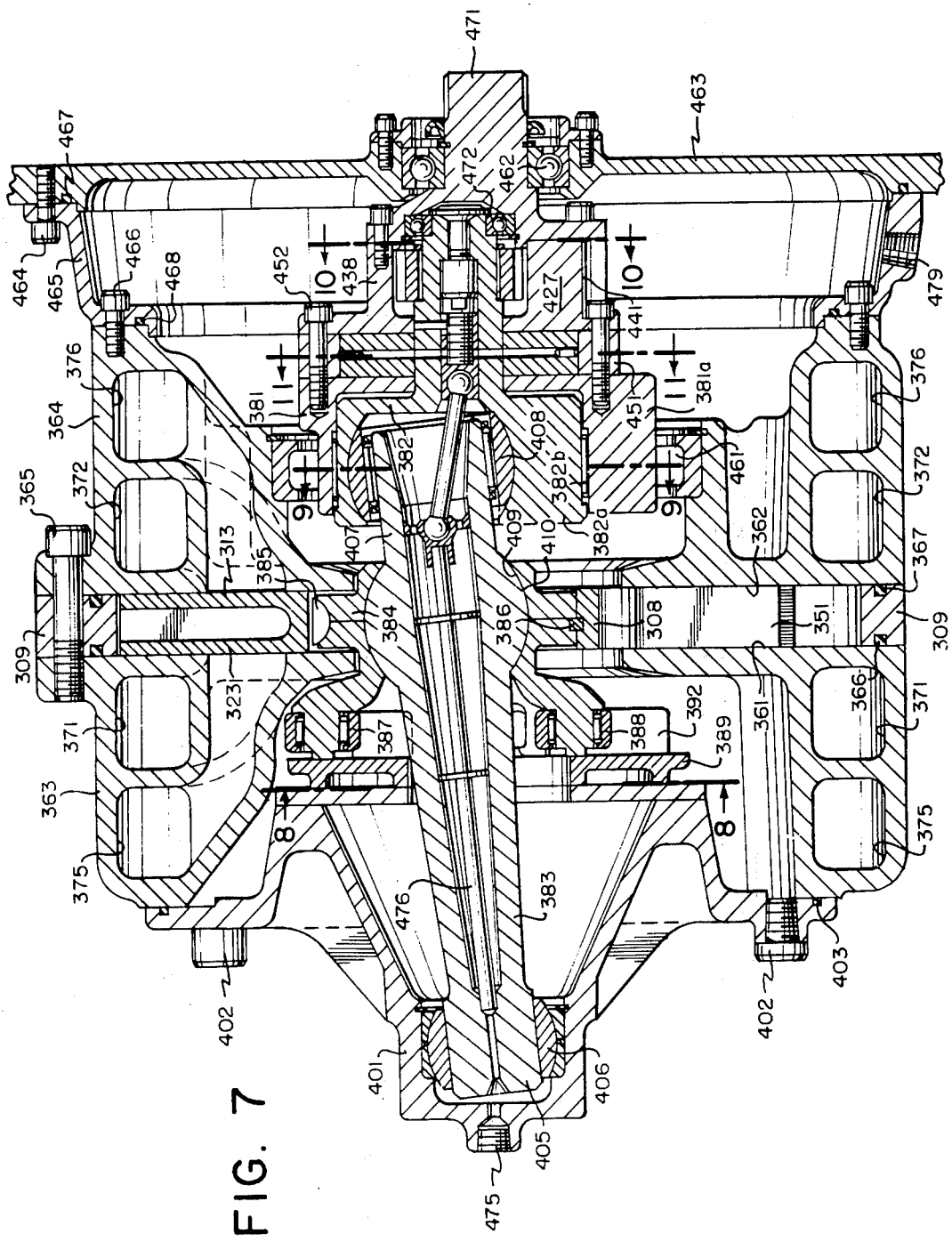
FIG. 7 is a cross-sectional view of the variable displacement hydraulic pump taken along the line 7—7 of FIG. 6.

Referring now to FIG. 7 of the drawings, there is shown a cross-sectional view of the variable displacement hydraulic pump 21 taken along the line 7—7 of FIG. 6. The spider 308 is located within the space bounded by circumferential member 309 and the opposed surfaces 361 and 362 of castings 363 and 364 respectively. Circumferential member 309 and castings 363 and 364 are held together by suitable fastening means such as, for example, bolts 365 to form the cylindrical casing 307. O-rings 366 and 367 are provided between casing 309 and castings 363 and 364 respectively in order to prevent leakage of hydraulic fluid. The legs of spider 308, such as for example leg 313 shown in FIG. 7, are preferably hollow in order to reduce the eccentric mass of the spider and thus reduce the dynamic balance problems of the pump.

As in the case of the hydraulic wheel motor shown in FIGS. 3-5 all of the inlet ports in surface 361 of casting 363, such as inlet port 323 for example, are connected to a circumferential passage 371 in casing 363 while all of the inlet ports in surface 362 of casting 364 are connected to the circumferential passage 372 in casting 364. Circumferential passages 371 and 372 are connected together by a Y coupling 373, shown in FIG. 6, and Y coupling 373 is connected to the return hydraulic line from the wheel motors.

Similarly, all of the outlet openings in surface 361 of casting 363 are connected to the circumferential passage 375 while all of the outlet openings in surface 362 of casting 364 are connected to the circumferential passage 376. The two circumferential passages 375 and 376 are connected together by a suitable Y coupling 377, shown in FIG. 6, and Y coupling 377 is connected to the output hydraulic line to the wheel motors.

Briefly, power is transmitted from the prime mover through an outer eccentric carrier 381, and inner eccentric carrier 382, and eccentric shaft 383 and the spider center member 384 to the spider 308. The spider center member 384 serves to constrain the spider 308 to orbital movement. Spider center member 384 is joined to spider 308 by a plurality of woodruff keys 385 which prevent the spider 308 from rotating with respect to the spider center member 384, and a plurality of segment keys 386 which prevents the spider center member 384 from moving in an axial direction with respect to spider 308.

Figure 8:
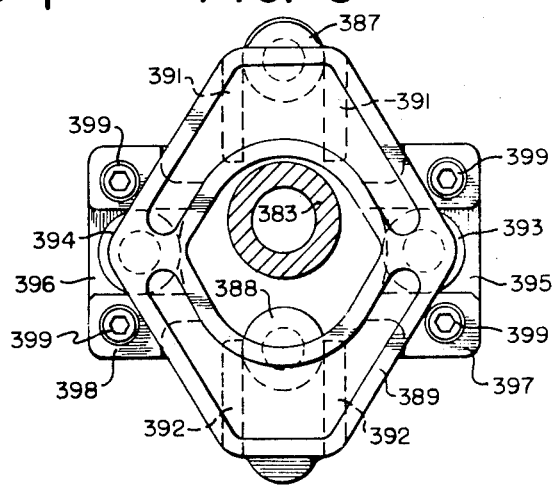
FIG. 8 is a cross-sectional view of the variable displacement pump taken along the line 8—8 of FIG. 7 showing the coupling device used to prevent rotation of the orbiting element.

Spider center member 384 also carries a pair of rollers 387 and 388 which engage the modified Oldham coupling member 389 which is shown more clearly in FIG. 8.

FIG. 8 is a cross-sectional view taken along the line 8—8 of FIG. 7. It shows the modified Oldham coupling 389 which includes flanges 391 for engaging the roller 387 mounted on spider center member 384 (shown in FIG. 7) and flanges 292 for engaging the roller 388 mounted on spider center member 384. Oldham coupling member 389 carries rollers 293 and 294 which ride in suitable slots 295 and 296 formed in brackets 397 and 398 respectively which are mounted on the stationary end member 401 by means of suitable fastening devices such as, for example, bolts 399.

It will be apparent that the rollers 393 and 394 cooperate with the slots 395 and 396, respectively, to constrain the movements of Oldham coupling member 389 to side-to-side movements and thus prevent Oldham coupling member 389 from rotating or moving a vertical direction. However, rollers 387 and 388 which are mounted on spider center member 384 (shown in FIG. 3) are constrained by flanges 391 and 392, respectively, to move in a vertical direction with respect to Oldham coupling member 389. The combined effect of the relative horizontal motion between Oldham coupling member 389 and the end member 401, and the relative vertical movement between spider center member 384 and Oldham coupling member 389 results in an orbital movement of spider center member 384 with respect to stationary end member 401 which is mounted on the casing 363 by suitable fastening means such as bolts 402 and O-ring seal 403, shown in FIG. 7.

Referring again to FIG. 7 of the drawings, it will be seen that one end 405 of eccentric shaft 383 is mounted to the stationary end member 401 by means of a sperical bearing 406 while the other end 407 of the eccentric shaft 383 is mounted on the inner eccentric carrier 382 by means of another spherical bearing 408. Further an intermediate portion of the eccentric shaft 383 is formed into a spherical bearing surface 409 which slidably engages the complementary surface 410 of spider center member 384. It will be appreciated by those skilled in the art that the three spherical bearings 406, 408 and 410 will accommodate the peculiar wobbling eccentric motion of shaft 383 as the degree of eccentricity is varied in order to vary the displacement of the pump 21.

The degree of eccentricity of the motion of shaft 383 is controlled by the relative angular positions of outer eccentric carrier 381 and inner eccentric carrier 382. More particularly, referring to FIG. 9 of the drawings, which is a cross-sectional view taken along the line 9—9 of FIG. 7, the outer eccentric carrier 381 and the inner eccentric carrier 382 are shown in a position to produce the maximum eccentricity of motion of shaft 383. On the other hand, if inner eccentric carrier 382 were rotated 180° within outer eccentric carrier 381, the end 407 of shaft 383 would be located near the center of rotation of the outer eccentric carrier 381, which condition would produce a minimum degree of eccentricity of motion of shaft 383. Intermediate angular positions of the inner eccentric carrier 382 with respect to outer eccentric carrier 381 will produce intermediate degrees of eccentricity of motion of the shaft 383. It will be appreciated that the effective displacement of the hydraulic pump of FIGS. 6 – 11 depends directly on the degree of eecentricity of motion of shaft 383.

It is noted that in the preferred form of variable displacement hydraulic pump according to the present invention, a roller bearing 382 is provided between outer eccentric carrier 381 and inner eccentric carrier 382 and a roller bearing 408A is provided between spherical bearing 408 and shaft 383 in order to reduce friction.

AUTOMATIC PUMP DISPLACEMENT CONTROL

The degree of eccentricity of motion of shaft 383, and hence the displacement of the hydraulic pump, is automatically controlled by a unique device which responds to both the speed and the torque reaction of the hydraulic pump 21. Briefly, when the torque reaction of the pump 21 is high, (such as, for example, when the vehicle is starting from a standstill or climbing a hill) the effective displacement of the hydraulic pump is automatically reduced with a concomitant reduction in the vehicle wheel speed, and the output pressure of the pump is correspondingly increased with a concomitant increase in the torque applied to the vehicle wheels. Conversely, when a reduced load on the present hydraulic power transmission system permits the hydraulic pump to speed up, the displacement of the pump is automatically increased which results in an increased hydraulic fluid flow rate and a correspondingly increased vehicle speed.

Figure 10:
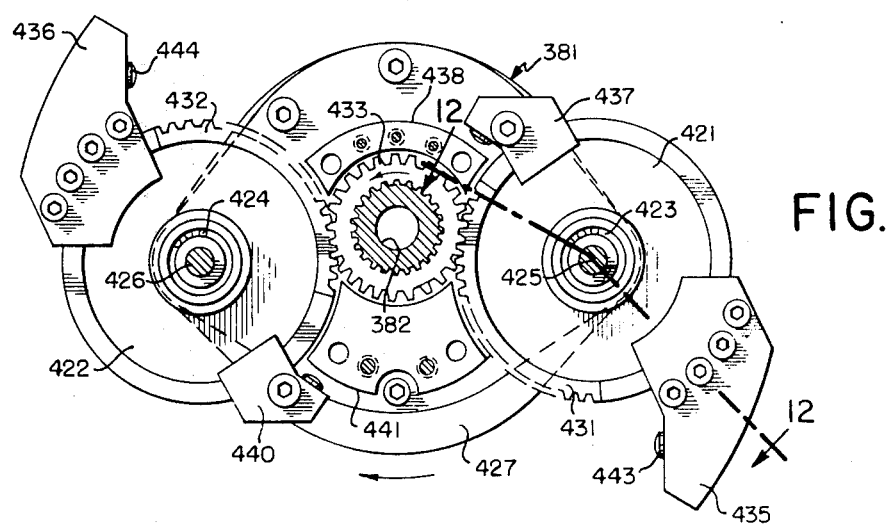
FIG. 10 is a cross-sectional view of the variable displacement hydraulic pump taken along the line 10—10 of FIG. 7 showing the automatic control mechanism for the inner and outer eccentric carriers.
Figure 12:
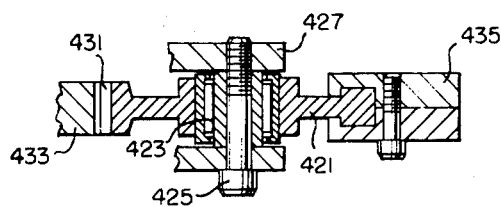
FIG. 12 is a cross-sectional view taken along the line 12—12 of FIG. 10.

The mechanism for automatically controlling the displacement of the hydraulic pump of FIGS. 7 – 11 is more clearly shown in FIG. 10 which is a cross-sectional view taken along the line 10 — 10 of FIG. 7. A pair of planetary gear wheels 421 and 422 are rotatably mounted by means of roller bearings 423 and 424 on journal pins 425 and 426 projecting from part 427 of outer eccentric carrier assembly 381. The gear sectors 431 and 432 of planetary gear wheels 421 and 422 engage the sun gear 433 which is mounted on the inner eccentric carrier 382.

Assuming constant torque and speed conditions, the entire assembly shown in FIG. 10 rotates in the clockwise direction in response to the driving force of the prime mover. The resulting centrifugal force on adjustable weight 435 attached to planetary gear wheel 421 and upon the adjustable weight 436 attached to control gear wheel 422 tends to urge the planetary gear wheels 421 and 422 to rotate in the counterclockwise direction with respect to part 427 of outer eccentric carrier assembly 381 so as to tend to bring adjustable stop 437 attached to planetary gear wheel 421 into contact with surface 438 of part 427 and to bring adjustable stop 440 attached to control gear wheel 422 into contact with the surface 441 of part 427. Therefore, it will be appreciated that, if the torque reaction force of the pump is low, the relationship of the parts shown in FIG. 10 will be determined primarily by the speed of rotation of the assembly which gives rise to centrifugal force on weights 435 and 436 which automatically adjusts the hydraulic pump to its maximum effective displacement.

On the other hand, if a substantial load is applied to the hydraulic power transmission system, there will be a substantial torque reaction force on the inner eccentric carrier assembly 382 which will tend to slow down its rotation. The slowing down of inner eccentric carrier 382 may be regarded as a counterclockwise rotation of inner eccentric carrier 382 and sun gear 433 with respect to outer eccentric carrier 381. The relative counterclockwise rotation of inner eccentric carrier 382 reduces the eccentricity of the movement of end 407 of eccentric shaft 383 as explained above in connection with FIG. 9 and simultaneously causes the planetary gear wheels 421 and 422 shown in FIG. 10 to rotate clockwise with respect to part 427 of outer eccentric carrier assembly 381 until a new balance is found between the centrifugal force on weights 435 and 436 on the one hand, and the torque reaction force on inner eccentric carrier 382 on the other hand. This new balance determines the effective displacement and corresponding output flow rate of and output pressure of the hydraulic pump.

If the load on the hydraulic power transmission system is very large, the counterclockwise torque reaction force upon inner eccentric carrier 382 will cause the control gear wheels 421 and 422 to rotate clockwise with respect to part 427 of outer eccentric carrier assembly 381 until the stop 433 on weight 435 contacts the surface 441 of part 427 and stop 444 on weight 436 contacts the surface 438 of part 427, thus bringing the hydraulic pump to a condition of minimum displacement and output flow rate and maximum output pressure.

Referring now to FIG. 11 of the drawings which is a cross-sectional view taken along the line 11—11 of FIG. 7, there is shown the preferred form of damper mechanism for the automatic displacement control device described in connection with FIG. 10. The damper mechanism includes a cylindrical casing 451 which forms a part of the outer eccentric carrier assembly 381. The casing 451 is secured to parts 427 and 381A of the outer eccentric carrier assembly 381 by suitable fastening means such as, for example, bolts 452. A pair of inwardly projecting stationary vanes 453 and 454 are secured to opposite sides of the cylindrical inner surface 455 of housing 451 by suitable fastening means such as, for example, bolts 453A and 454A.

Rotor 456 is splined to the inner eccentric carrier 382 and has a pair of outwardly extending vanes 457 and 458 which extend outward to the inner surface 455 of housing 451. The space between rotor 456 and the inner surface 455 of housing 451 is filled with hydraulic fluid which serves to damp the rotation of rotor 456 with respect to the housing 451.

As in the case of the displacement control device of FIG. 10, the damper mechanism of FIG. 11 is shown in the condition of maximum displacement of the hydraulic pump. If a load is applied to the hydraulic power transmission system, the rotor 456 will rotate in a counterclockwise direction with respect to housing 451 corresponding to the counterclockwise rotation of sun gear 433 relative to part 427 of outer eccentric carrier 381 shown in FIG. 10. The action of the damper mechanism of FIG. 11 serves to prevent the displacement control device of FIG. 10 from "hunting" to find a new balance between changing speed and torque conditions.

It is also noted that rotor 456 can rotate slightly in a clockwise direction before its vanes 457 and 458 contact the stationary vanes 453 and 454. This permits the inner eccentric carrier 382 to rotate slightly beyond the position of maximum displacement, and thus enables the hydraulic transmission system of the present invention to serve a dynamic braking function when the accelerator control is released while the vehicle is moving at speed.

Referring again to FIG. 7 of the drawings, one end of outer eccentric carrier assembly 381 is rotatably mounted within casting 364 by means of roller bearing 461. The other end of outer eccentric carrier assembly 381 is carried by ball bearings 462 which are mounted on end of plate 463 which is secured by suitable means such as bolt 464 to a skirt 465 which is in turn secured by suitable means such as bolt 466 to the casting 364. O-ring seals 467 and 468 are provided in order to prevent fluid leakage through the joints between end of plate 463, skirt 465 and casting 364.

One end of the inner eccentric carrier assembly 382 is rotatably mounted within part 381a of outer eccentric carrier assembly 381 by means of roller bearings 382b while the other end inner eccentric carrier assembly 382 is mounted within part 471 of outer eccentric carrier assembly 381 by means of ball bearings 472.

Lubrication of the various bearing surfaces of the variable displacement hydraulic pump of FIGS. 6–12 is accomplished in various ways. For example, the complementary bearing surfaces 409 of eccentric shaft 383 and surface 410 of spider center member 384 are lubricated by high pressure hydraulic fluid which is forced inward from the pumping chambers 341–345 shown in FIG. 6 to the bearing surfaces 409 and 410 through the hollow legs 311–315 of spider 308 and passages, such as passage 474 extending through spider 308 and spider center member 384 as shown in FIG. 6.

In addition, fluid from the low pressure (150 p.s.i.) system is introduced into the variable displacement hydraulic pump of FIGS. 6–12 through the opening 475 shown in FIG. 7. This fluid finds its way through the central passage 476 in shaft 383 to the center of inner eccentric carrier assembly 382 from whence it is distributed into the damper mechanism shown in FIG. 11 through the passages 477 and 478 in vanes 457 and 458 respectively. Lubricating fluid which leaks into the interior spaces of the hydraulic pump assembly is scavenged through an opening 479, shown in FIG. 7, which is provided for that purpose.

THE BRAKE CONTROL APPARATUS

Figure 14:
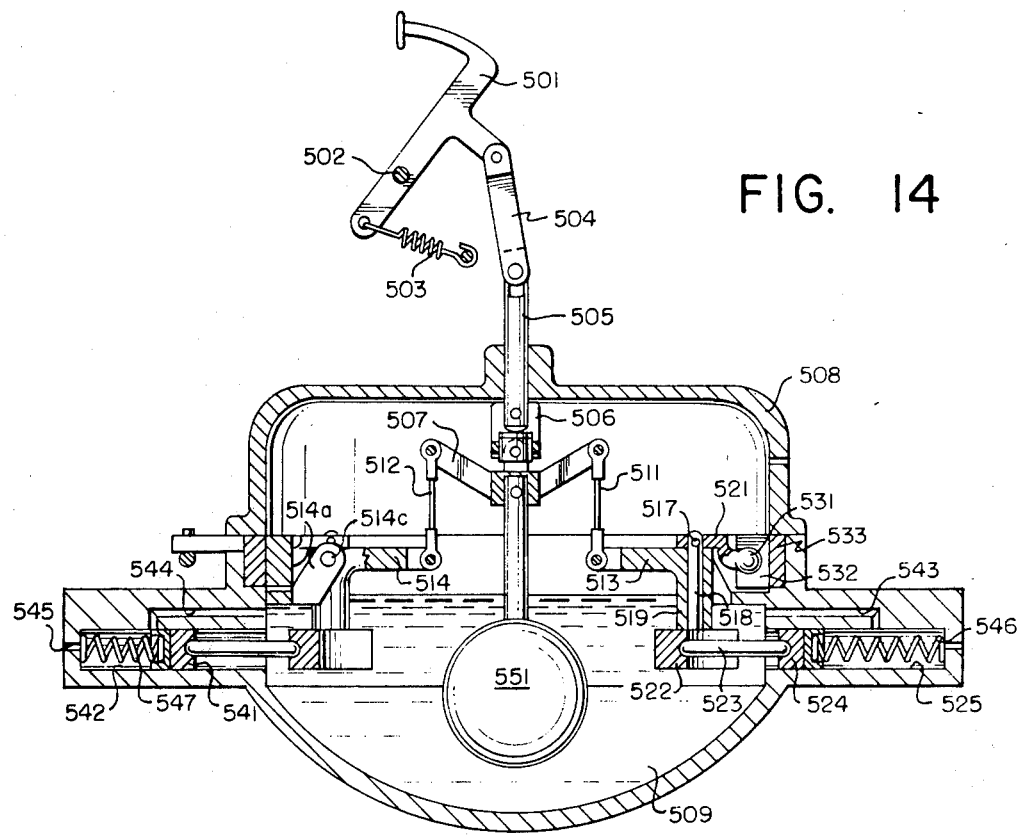
FIG. 14 is a cross-sectional view of the brake control apparatus taken along the line 14—14 of FIG. 13.

Referring now to FIG. 13 of the drawings, there is shown a plan view, partially in cross-section and partly broken away of a preferred embodiment of the brake control apparatus used in the present hydraulic power transmission and braking system. FIG. 14 is a cross-sectional view of the brake control apparatus taken along the line 14—14 of FIG. 13. Referring to FIG. 14, the brake pedal 501 is pivoted about a pin 502 mounted on the vehicle chassis and biased by a spring 503 to the "brake off" position. Brake pedal 501 is connected by links 504, 505 and 506 to a four-way brake link 507 which is located within a vessel 508 that is partially filled air under moderate pressure and partly filled with brake fluid 509. Each of the four legs of link 507 is connected by a substantially vertical link such as links 511 and 512 shown in FIG. 14 to one of the L-shaped actuating links 513, 514 and 515 and 516. Each of the L-shaped links 513–516 is pivotably mounted to the vessel 508 by a pair of arms, such as arms 514a and 514b, which engage suitable journal pins such as for example pins 514c and 514d, respectively, projecting from L-shaped link 514. A rod extends through a passage in the vertical leg of each of the L-shaped links 513–516 as, for example, rod 517 extends through the passage 518 in the vertical leg 519 of L-shaped link 513. A toggle 521 is fixed to the upper end of rod 517 while an arm 522 is fixed to its lower end. One end of arm 522 is connected by a rod 523 to the brake control piston 524 which rides within brake control cylinder 525. The other end of arm 522 is connected by a rod 526 to the brake control piston 527 which rides within brake control cylinder 528 shown in FIG. 13.

Referring again to FIG. 14, it will be seen that the end 531 of toggle 521 engages a suitable socket 532 in circumferential control ring 533. Referring again to FIG. 13, it will be seen that circumferential control ring 533 is biased to the position shown in FIG. 13 by means of a spring 534 which engages the arm 535 projecting from control ring 533. For purposes of illustration, we shall call the position of control ring 533 shown in FIG. 13 the "forward" position because it is the correct position of control ring 533 for operating the braking system when the vehicle is moving in the forward direction.

Arm 535 of control ring 533 is connected by a rod 536 to the solenoid plunger 537. The solenoid coil 538 is connected to a suitable flow direction sensor 61 which is appropriately located in one of the high-pressure hydraulic fluid lines such as line 41 shown in FIG. 1, to energize the solenoid coil 538 when the vehicle is moving in the reverse direction. When the solenoid coil 538 is energized the plunger 537 is moved to the position 537a which serves to move the control ring 533 in the counterclockwise direction thus switching the four toggles such as toggle 521 shown in FIG. 14, and the four arms, such as arm 522, to which the toggles are connected by their associated rods, such as rod 517. The effect of switching arm 522 is to advance piston 524 within cylinder 525 while retracting piston 527 within cylinder 528. As will be seen from the following description, only those brake control pistons which are in the advanced position within their respective cylinders are capable of actuating their associated brake valves when the brake pedal 501, shown in FIG. 14, is depressed.

Referring to FIG. 14, it will be noted that the control brake piston 524, which is associated with the reverse brake for the right rear wheel of the vehicle, is in the retracted position within its cylinder 525. By contrast, the brake control piston 541, which is associated with the forward brake for the right front wheel of the vehicle, is in the advanced position within its cylinder 542. When the brake pedal 501 is depressed, the four-way link 507 moves downward, thus causing the L-shaped links 513 and 514 to pivot about their journal pins so as to drive the pistons 524 and 541 further into their respective cylinders 525 and 542 respectively. Because it is in the retracted position, the motion of piston 524 in response to the brake pedal 501 simply causes the brake fluid within the cylinder 525 to pass back into the vessel 508 through passage 543. On the other hand, because piston 541 is in the advanced position, it cuts off the passage 544 so that the further motion of piston 541 in response to the brake pedal 501 sends fluid under pressure through passage 545 to the forward brake valve 57 (FIG. 1B) for the right front wheel of the vehicle. Moreover, inspection of FIG. 13 will shown that when the control ring 533 is in the forward position each of the forward brake control valves is in the advance position within its associated cylinder and also that when the brake pedal is depressed, all four of the forward brake valves of the vehicle will be actuated.

Referring again to FIG. 14, it is noted that each of the brake control cylinders is provided with a compression spring for returning their associated pistons to their starting positions when the brake pedal 501 is released. For example, cylinder 525 is provided with a spring 546 and cylinder 542 is provided with a spring 547.

Another feature of the brake control system of FIGS. 13 and 14 is that the braking force is automatically apportioned between the wheels of the vehicle in accordance with the momentary traction of each wheel as determined by the load on each wheel. This is accomplished primarily by the action of pendulum 551 which depends from the four-way link 507 shown in FIGS. 13 and 14. Assuming, for purposes of illustration, that all four of the vehicle wheels are equally loaded when the vehicle is at rest, and assuming that the vehicle is moving in the forward direction (as indicated by arrow 552 in FIG. 15) at a constant speed so that the pendulum 551 is in its normal position at the instant when the brake pedal 501 is first depressed, the braking force will initially be distributed equally between all four wheels of the vehicle. However, as soon as the vehicle begins to decelerate, its momentum serves to place a greater load on the front wheels and a lesser load on the rear wheels. For efficient braking under such conditions, it is necessary to apply a proportionally greater braking force to the front wheels which have greater traction under such conditions and a proportionally lesser braking force to the rear wheels. This is exactly what is accomplished by the action of pendulum 551 which swings forward by an amount proportional to the rate of deceleration of the vehicle.

As the pendulum 551 swings forward, it causes the four-way link 507 to tilt in such a way as to press downward on the L-shaped links 514 and 515, thus pressing the forward brake control pistons further into their associated cylinders and thereby more strongly actuating the forward brake valves for the front wheels of the vehicle. At the same time, the tilting of four-way link 507 in response to the motion of pendulum 551 serves to lift the L-shaped link 513 and 516, thus somewhat retracting the rear wheel brake control pistons within their associated cylinders thereby less strongly actuating the forward brake valves for the rear wheels of the vehicle.

It will also be appreciated that the action of pendulum 551 also serves to properly apportion the braking force under other operating conditions. For example, if the brakes are applied while the vehicle is making a high-speed turn to the left so that the outside, or right wheels are more heavily loaded, the pendulum 551 will also swing toward the outside of the turn thus causing a stronger braking force to be applied to the right wheels. Further, in a situation where the rear of the vehicle is heavily loaded, such as for example by an overweight cargo which causes the rear of the vehicle to ride lower than the front, the pendulum 551 will hang somewhat to the rear of its normal position, thus causing a greater proportion of the braking force to be applied to the rear wheels of the vehicle.

Referring now to FIG. 15 of the drawings, there is shown a side elevation view in cross-section of the preferred form of brake valve 561 according to the present invention. Before the brakes are applied, hydraulic fluid from the wheel motor associated with brake valve 561 passes through passage 562, valve chamber 563 and passage 564 in valve housing 565 to return to the hydraulic pump. The valve member 566 is maintained in the position shown in FIG. 15 by low pressure (150 psi) hydraulic fluid which acts through passage 567, pilot valve chamber 568, passage 569 and the lower portion 563A of valve chamber 563 against the lower end 566A of valve member 566 to hold the valve member 566 in the upper position shown in FIG. 15.

When the vehicle operator presses the brake pedal 501 shown in FIG. 14, a pressure signal from the appropriate brake control cylinder is transmitted via passage 571 to piston 572 of the brake valve 561 shown in FIG. 15. As the piston 572 moves upward against the force of compression spring 573, it acts through links 574 and 575 to lift the pilot valve member 576 to the point where the low pressure (150 psi) hydraulic fluid in passage 567 is connected through pilot valve chamber 568 to passage 577 and thence to the upper portion 563B of main brake valve chamber 553 where it acts to press down upon the upper portion 566B of the valve member 566. At the same time, the upward movement of pilot valve 576 serves to connect the passage 569 to passage 578 which returns to the hydraulic fluid scavenging system, so that, as the main brake valve member 566 moves downward, the fluid in the lower portion 553A of chamber 556 is exhausted to the scavenging system. As the upper portion 566B of main brake valve member 566 moves downward into the central portion of the valve chamber 563, it restricts the return flow of hydraulic fluid from the wheel motor via passage 552 to the pump via passage 564. When the brake pedal 501 of FIG. 14 is fully depressed, the valve member 566 of FIG. 15 will move downward until its upper portion 566B completely cuts off the return flow of hydraulic fluid from the wheel motor to the top, thus causing a maximum back pressure on the wheel motor, resulting in a maximum braking effect.

It will also be noted that the downward movement of main brake valve member 566 is coupled through link 574 and 575 to pilot valve member 576, thus tending to cut off the flow of low pressure (150 psi) hydraulic fluid to the upper portion 563B of main valve chamber 563, thus stabilizing the position of the main brake valve member 566. This relationship between the main valve 566 and the pilot valve 576 will be recognized by those skilled in the art as a follow-up type relationship.

When the brake pedal 501 of FIG. 14 is released, piston 572 of FIG. 15 moves downward, thus causing the pilot valve 576 to move downward, thus causing the main valve 566 to move upward in response to the low pressure (150 psi) hydraulic fluid through the passages 567 and 569. The hydraulic fluid in the upper portion of 563B of chamber 563 is exhausted through passages 577 and 579 to the scavenging system. The upward motion of valve member 566 is coupled through length 574 and 575 to bring about the desired follow-up action of pilot valve 576.

Referring now to FIG. 16 of the drawings, there is shown an embodiment of a fluid flow direction sensing device suitable for use in connection with the brake control apparatus of FIGS. 13 and 14. The fluid flow direction sensing device, generally designated 61, is preferably located on a hydraulic fluid conduit connected to one of the hydraulic wheel motors, such as conduit 41 shown in FIG. 1A. The flow direction sensing device 61 includes a reed member 581 which is pivotally mounted to the enclosure 582 by a pin 583. The end 584 of reed 581 projects through an opening 585 in conduit 41 and is thus subjected to the influence of the hydraulic fluid flowing in conduit 41.

When the hydraulic fluid flow direction corresponds to forward vehicle movement as indicated by the arrow 586 in FIG. 16, the electrical contact 587 mounted on reed 581 remains out of contact with the stationary electrical contact 588 mounted on enclosure 582. However, when the fluid flow direction within conduit 41 is reversed, corresponding to reverse vehicle movement, the action of the hydraulic fluid on the tip 584 of reed 581 will bring electrical contact 587 into contact with the stationary electrical contact 588 thus establishing a circuit which serves to energize the solenoid 538 shown in FIG. 13.

Although the principles of the present invention have been illustrated by reference to a preferred form of hydraulic power transmission and braking system for vehicles, it will be recognized that the present invention will find application in other instances where rotary power is to be transmitted hydraulically with inifinite speed and torque variation.

While the subject hydraulic power transmission and braking system has been illustrated by reference to a preferred embodiment and several modifications and adaptations thereof, it will be appreciated by those skilled in the art that other modifications and adaptations of the disclosed apparatus may be made without departing from the spirit and scope of the present invention which is set forth with particularity in the appended claims.

What is claimed is:

1. Brake control apparatus for automatically apportioning braking of the wheels of a vehicle in accordance with the load on respective wheels, comprising:
   a brake pedal controllable by a vehicle operator;
   a plurality of brake control cylinder assemblies, each brake control cylinder assembly corresponding to a wheel of said vehicle and being actuable to produce braking of the corresponding wheel;
   mechanical means linking said brake pedal to each of said brake control cylinder assemblies for actuating said brake control cylinder assemblies equally in response to said brake pedal;
   a pendulum;
   means mounting said pendulum for displacement along the length and width of said vehicle from a predefined normal position and mechanical means connecting said pendulum to said actuating means, said connecting means including means responsive to lengthwise displacement of said pendulum for producing differences in actuation between brake cylinder assemblies corresponding to wheels at different locations along the length of the vehicle, and means responsive to widthwise displacement of said pendulum for providing differences in actuation between brake cylinder assemblies corresponding to wheels at different locations along the width of the vehicle for increasing the actuation of at least one of said brake cylinder assemblies while decreasing the actuation of at least another of said brake cylinder assemblies.

2. The vehicular brake control apparatus of claim 1 further comprising:
   a fluid-containing chamber, said pendulum being suspended in said fluid-containing chamber whereby the oscillations of said pendulum are damped by said fluid.

3. Apparatus for automatically apportioning braking force to at least two vehicle wheels in accordance with the load on the respective wheels comprising:
   a brake control housing;
   at least two brake control cylinders formed in said housing;
   at least two brake control pistons, each piston riding within a respective brake control cylinder and adapted to be associated with a respective wheel;
   a brake member operable by the vehicle occupant;
   an actuation member extending into said housing connectable to said brake member, said actuation member being adapted for movement upon operation of said brake member;
   means coupling said actuation member to each of said brake control pistons for moving said pistons a predetermined amount within said cylinders upon being actuated by said actuation member; and
   means coupled to said moving means for sensing the load on the respective wheels and for adjusting said predetermined amount of movement of respective ones of said pistons within said cylinders as a function of said sensed loads, said sensing and adjusting means being constructed and arranged to sense load differences between wheels on either side of said vehicle as well as between front and rear wheels and to adjust the movement of the corresponding piston accordingly.

4. Apparatus as recited in claim 3 wherein said sensing and adjusting means includes means for increasing said predetermined amount of movement of those pistons associated with respective wheels which are subjected to greater than normal loads and for decreasing said predetermined amount of movement of those pistons associated with respective wheels which are subjected to less than normal loads.

5. Apparatus as recited in claim 3 wherein said sensing and movement adjusting means comprise a pendulum assembly suspended from said moving means adapted for substantially free swinging movement.

6. Apparatus as recited in claim 3 wherein said moving means comprises a linkage assembly including at least two linkage sets, each linkage set coupling said actuation member and a respective one of said brake control pistons.

7. Apparatus as recited in claim 6 wherein each said linkage set includes a pivotally mounted link adapted to be pivoted upon movement of said actuation member whereby a respective piston is moved within its respective cylinder.

8. Apparatus as recited in claim 7 wherein said sensing and movement adjusting means comprises a pendulum assembly suspended from said linkage assembly adapted for substantially free swinging movement, and said linkage assembly includes means for adjusting the extent of pivoting of said pivotally mounted link according to the direction and extent of swinging movement of said pendulum.

9. Apparatus as recited in claim 3 wherein each of said brake control cylinders communicates through an opening formed at its end with a brake fluid circuit associated with the respective wheel.

10. Apparatus for automatically apportioning brake force to at least two vehicle wheels in accordance with the load on the respective wheels comprising:
a brake control housing;
at least two pairs of first and second brake control pistons, each pair of pistons riding within a respective pair of brake control cylinders formed in said housing, each piston pair adapted to be associated with a respective wheel,
an actuation member extending into said housing connectable to a brake member operable by the vehicle occupant, said actuation member being adapted for movement upon operation of said brake member;
means coupling said actuation member to each of said pairs of brake control pistons, said coupling means including means for selectively locating either of said first or second pistons of each respective pair of pistons into operative engagement with its respective cylinder while simultaneously locating the other of said first and second pistons of each respective pair of pistons into inoperative engagement with its respective cylinder and means for moving said operatively engaged pistons a predetermined amount within said cylinders upon being actuated by said actuation member; and
means coupled to said moving means for sensing the load on the respective wheels and for adjusting said predetermined amount of movement of respective ones of said operatively engaged pistons within said cylinders as a function of said sensed loads.

11. Apparatus as recited in claim 10 wherein said sensing and movement adjusting means comprise a pendulum assembly suspended from said moving means adapted for substantially free swinging movement.

12. Apparatus as recited in claim 10 wherein said selective piston locating means includes a toggle link associated with each pair of pistons adapted to be located in either a first or a second position and an arm connected to each said toggle link, said first and second pistons of each piston pair being connected to respective ends of said arm.

* * * * *